United States Patent
Chen et al.

(10) Patent No.: US 12,244,846 B2
(45) Date of Patent: *Mar. 4, 2025

(54) METHODS AND SYSTEMS FOR PERFORMING GRADUAL DECODING REFRESH PROCESSING ON PICTURES

(71) Applicant: ALIBABA GROUP HOLDING LIMITED, Grand Cayman (KY)

(72) Inventors: Jie Chen, Beijing (CN); Ru-Ling Liao, Beijing (CN); Yan Ye, San Diego, CA (US); Jiancong Luo, Skillman, NJ (US)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 18/464,681

(22) Filed: Sep. 11, 2023

(65) Prior Publication Data
US 2023/0421795 A1     Dec. 28, 2023

Related U.S. Application Data

(63) Continuation of application No. 17/108,534, filed on Dec. 1, 2020, now Pat. No. 11,758,171.
(Continued)

(51) Int. Cl.
*H04N 19/46* (2014.01)
*H04N 19/107* (2014.01)
(Continued)

(52) U.S. Cl.
CPC ........... *H04N 19/46* (2014.11); *H04N 19/107* (2014.11); *H04N 19/117* (2014.11);
(Continued)

(58) Field of Classification Search
CPC .. H04N 19/107; H04N 19/117; H04N 19/119; H04N 19/172; H04N 19/30;
(Continued)

(56) References Cited

U.S. PATENT DOCUMENTS

| 11,758,171 B2 * | 9/2023 | Chen ...................... H04N 19/30 |
| | | 375/240.02 |
| 2013/0077681 A1 | 3/2013 | Chen et al. |

(Continued)

FOREIGN PATENT DOCUMENTS

| CN | 104823449 A | 8/2015 |
| CN | 104885460 A | 9/2015 |

(Continued)

OTHER PUBLICATIONS

PCT International Search Report and Written Opinion mailed Apr. 6, 2021, issued in corresponding International Application No. PCT/US2020/062681 (9 pgs.).

(Continued)

*Primary Examiner* — Kathleen M Walsh
(74) *Attorney, Agent, or Firm* — Finnegan, Henderson, Farabow, Garrett & Dunner, LLP

(57) ABSTRACT

Methods and apparatuses video processing include: in response to receiving a video sequence, encoding first flag data in a parameter set associated with the video sequence, wherein the first flag data represents whether gradual decoding refresh (GDR) is enabled or disabled for the video sequence; when the first flag data represents that the GDR is disabled for the video sequence, encoding a picture header associated with a picture in the video sequence to indicate that the picture is a non-GDR picture; and encoding the non-GDR picture.

18 Claims, 14 Drawing Sheets

Related U.S. Application Data

(60) Provisional application No. 62/954,011, filed on Dec. 27, 2019.

(51) Int. Cl.
*H04N 19/117* (2014.01)
*H04N 19/119* (2014.01)
*H04N 19/172* (2014.01)
*H04N 19/70* (2014.01)
*H04N 19/82* (2014.01)

(52) U.S. Cl.
CPC ......... *H04N 19/119* (2014.11); *H04N 19/172* (2014.11); *H04N 19/70* (2014.11); *H04N 19/82* (2014.11)

(58) Field of Classification Search
CPC ...... H04N 19/46; H04N 19/503; H04N 19/70; H04N 19/82
USPC .................................................... 375/240.02
See application file for complete search history.

(56) References Cited

U.S. PATENT DOCUMENTS

| | | | |
|---|---|---|---|
| 2014/0079138 A1 | 3/2014 | Auyeung et al. | |
| 2014/0092963 A1 | 4/2014 | Wang | |
| 2014/0192896 A1 | 7/2014 | Wang et al. | |
| 2014/0198857 A1 | 7/2014 | Deshpande | |
| 2014/0341307 A1 | 11/2014 | Barak | |
| 2019/0373276 A1 | 12/2019 | Hu | |
| 2021/0136419 A1* | 5/2021 | Hsiang | H04N 19/174 |
| 2021/0195248 A1* | 6/2021 | Coban | H04N 19/172 |

FOREIGN PATENT DOCUMENTS

| | | | | |
|---|---|---|---|---|
| CN | 104919803 A | 9/2015 | | |
| JP | 2022526088 A | 5/2022 | | |
| WO | 2014006860 A1 | 1/2014 | | |
| WO | 2020185962 A1 | 9/2020 | | |
| WO | WO 2020/185957 A1 | 9/2020 | | |
| WO | WO 2021/022270 A1 | 2/2021 | | |
| WO | WO 2021/022273 A1 | 2/2021 | | |
| WO | WO 2021/029987 A1 | 2/2021 | | |
| WO | WO-2021022270 A2 * | 2/2021 | .......... | H04N 19/105 |
| WO | WO 2021/061462 A1 | 4/2021 | | |
| WO | WO 2021/133909 A1 | 7/2021 | | |

OTHER PUBLICATIONS

ITU-T H.265 "Series H: Audiovisual and Multimedia Systems Infrastructure of audiovisual services-Coding of moving video." Switzerland, Geneva, pp. 1-317 (2013).
Gary J. Sullivan "Overview of the High Efficiency Video Coding (HEVC) Standard," IEEE Transactions on Circuits and Systems for Video Technology, vol. 22, No. 12, pp. 1649-1668 (2012).
Jianle Chen "Algorithm Description of Joint Exploration Test Model 7 (JEM 7)" $7^{th}$ Meeting: Torino, IT Jul. 13-21, 2017, pp. 1-50 (2017).
N17074 "Requirements for a Future Video Coding Standard v5," International Organisation for Standardisation Organisation Internationaale de Normalisation ISO/IEC JTC 1/SC 29/WG 11 Coding of Moving Pictures and Audio, Torino, IT pp. 1-13 (2017).
J.Chen et al. "Test Model 7 of Versatile Video Coding (VTM 7)," $16^{th}$ Meeting: Geneva, CH, Oct. 1-11, 2019 , pp. 1-90.
Benjamin Bross et al. "Versatile Video Coding (Draft 7)" $16^{th}$ Meeting: Geneva, CH Oct. 1-11, 2019, pp. 1-491.
Communication pursuant to Rule 164(1) EPC issued by the European Patent Office in corresponding European Application No. 20905125.9, mailed Mar. 6, 2023. (15 pages).
Bross et al., "Versatile Video Coding (Draft 6)," JVET-O2001-vE, $15^{th}$ Meeting: Gothenburg, SE, Jul. 3-12, 2019, 463 pages.
Chen et al., "AHG9: A fix for GDR signaling," JVET-Q0414-V1, $17^{th}$ Meeting: Brussels, BE, Jan. 7-17, 2020, 3 pages.
Chinese Search Report issued in corresponding Chinese Application No. 202080086175.2 (1 page), Sep. 15, 2022.
Japanese Office Action issued in corresponding Japanese Application No. 2022-532693 on Nov. 27, 2024 (13 pages).

* cited by examiner

Table 1: Example Syntax of SPS Enabling GDR

| seq_parameter_set_rbsp( ) { | Descriptor |
|---|---|
| ... | |
| gdr_enabled_flag | u(1) |
| ... | |

FIG. 6

Table 2: Example Syntax of PH Enabling GDR

| picture_header_rbsp( ) { | Descriptor |
|---|---|
| ... | |
| gdr_pic_flag | u(1) |
| no_output_of_prior_pics_flag | u(1) |
| if( gdr_pic_flag ) | |
|   recovery_poc_cnt | ue(v) |
| ... | |

FIG. 7

Table 3: Example Syntax of SPS Enabling Virtual Boundary

| seq_parameter_set_rbsp( ) { | Descriptor |
|---|---|
| …. | |
|    sps_virtual_boundaries_present_flag | u(1) |
|    if( sps_virtual_boundaries_present_flag ) { | |
|      sps_num_ver_virtual_boundaries | u(2) |
|      for( i = 0; i < sps_num_ver_virtual_boundaries; i++ ) | |
|        sps_virtual_boundaries_pos_x[ i ] | u(13) |
|      sps_num_hor_virtual_boundaries | u(2) |
|      for( i = 0; i < sps_num_hor_virtual_boundaries; i++ ) | |
|        sps_virtual_boundaries_pos_y[ i ] | u(13) |
|    } | |

FIG. 8

Table 4: Example Syntax of PH Enabling Virtual Boundary

| picture_header_rbsp( ) { | Descriptor |
|---|---|
| … | |
|    if( !sps_virtual_boundaries_present_flag ) { | |
|      ph_virtual_boundaries_present_flag | u(1) |
|      if( ph_virtual_boundaries_present_flag ) { | |
|        ph_num_ver_virtual_boundaries | u(2) |
|        for( i = 0; i < ph_num_ver_virtual_boundaries; i++ ) | |
|          ph_virtual_boundaries_pos_x[ i ] | u(13) |
|        ph_num_hor_virtual_boundaries | u(2) |
|        for( i = 0; i < ph_num_hor_virtual_boundaries; i++ ) | |
|          ph_virtual_boundaries_pos_y[ i ] | u(13) |
|      } | |
|    } | |

FIG. 9

Table 5: Example Syntax of Modified PH

| picture_header_rbsp( ) { | Descriptor |
|---|---|
| ... | |
| if(gdr_enabled_flag) | |
|   gdr_pic_flag | u(1) |
|   no_output_of_prior_pics_flag | u(1) |
|   if( gdr_pic_flag ) | |
|     recovery_poc_cnt | ue(v) |
| ... | |

(1002 points to the if(gdr_enabled_flag) row)

FIG. 10

Table 6: Example Syntax of Modified SPS Enabling Virtual Boundary

| seq_parameter_set_rbsp( ) { | Descriptor |
|---|---|
| .... | |
| ~~sps_virtual_boundaries_present_flag~~ | ~~u(1)~~ |
| sps_virtual_boundaries_loopfilter_disable | u(2) |
| if( ~~sps_virtual_boundaries_present_flag~~ | |
|   sps_virtual_boundaries_loopfilter_disable ) { | |
|   sps_num_ver_virtual_boundaries | u(2) |
|   for( i = 0; i < sps_num_ver_virtual_boundaries; i++ ) | |
|     sps_virtual_boundaries_pos_x[ i ] | u(13) |
|   sps_num_hor_virtual_boundaries | u(2) |
|   for( i = 0; i < sps_num_hor_virtual_boundaries; i++ ) | |
|     sps_virtual_boundaries_pos_y[ i ] | u(13) |
| } | |

(1102: sps_virtual_boundaries_present_flag; 1104: sps_virtual_boundaries_loopfilter_disable; 1106: u(1); 1108: u(2); 1110: sps_virtual_boundaries_present_flag; 1112: sps_virtual_boundaries_loopfilter_disable)

FIG. 11

Table 7: Example Syntax of Modified PH Enabling Virtual Boundary

| picture_header_rbsp( ) { | Descriptor |
|---|---|
| ...                 1202 | |
| if( ! ~~sps_virtual_boundaries_present_flag~~ | |
|     sps_virtual_boundaries_loopfilter_disable ) {    ← 1204 | |
|     ~~ph_virtual_boundaries_present_flag~~    ← 1206 | u(1) |
|     ph_virtual_boundaries_loopfilter_disable    ← 1208 | |
|     if( ~~ph_virtual_boundaries_present_flag~~    ← 1210 | |
|         ph_virtual_boundaries_loopfilter_disable ) {    ← 1212 | |
|         ph_num_ver_virtual_boundaries | u(2) |
|         for( i = 0; i < ph_num_ver_virtual_boundaries; i++ ) | |
|             ph_virtual_boundaries_pos_x[ i ] | u(13) |
|         ph_num_hor_virtual_boundaries | u(2) |
|         for( i = 0; i < ph_num_hor_virtual_boundaries; i++ ) | |
|             ph_virtual_boundaries_pos_y[ i ] | u(13) |
|     } | |
| } | |

FIG. 12

METHODS AND SYSTEMS FOR PERFORMING GRADUAL DECODING REFRESH PROCESSING ON PICTURES

CROSS-REFERENCE TO RELATED APPLICATIONS

The present disclosure is a continuation of U.S. application Ser. No. 17/108,534, filed Dec. 1, 2020, which claims the benefit of priority to U.S. provisional application No. 62/954,011, filed Dec. 27, 2019, both of which are incorporated herein by reference in their entireties.

TECHNICAL FIELD

The present disclosure generally relates to video processing, and more particularly, to methods and systems for performing gradual decoding refresh (GDR) processing on pictures.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of present disclosure provide methods and apparatuses for video processing. In an aspect, a non-transitory computer-readable medium is provided. The non-transitory computer-readable medium stores a set of instructions that is executable by at least one processor of an apparatus to cause the apparatus to perform a method. The method includes: in response to receiving a video sequence, encoding first flag data in a parameter set associated with the video sequence, wherein the first flag data represents whether gradual decoding refresh (GDR) is enabled or disabled for the video sequence; when the first flag data represents that the GDR is disabled for the video sequence, encoding a picture header associated with a picture in the video sequence to indicate that the picture is a non-GDR picture; and encoding the non-GDR picture.

In another aspect, non-transitory computer-readable medium is provided. The non-transitory computer-readable medium stores a set of instructions that is executable by at least one processor of an apparatus to cause the apparatus to perform a method. The method includes: in response to receiving a video bitstream, decoding first flag data in a parameter set associated with a sequence of the video bitstream, wherein the first flag data represents whether gradual decoding refresh (GDR) is enabled or disabled for the video sequence; when the first flag data represents that the GDR is disabled for the sequence, decoding a picture header associated with a picture in the sequence, wherein the picture header indicates that the picture is a non-GDR picture; and decoding the non-GDR picture.

In yet another aspect, a non-transitory computer-readable medium is provided. The non-transitory computer-readable medium stores a set of instructions that is executable by at least one processor of an apparatus to cause the apparatus to perform a method. The method includes: in response to receiving a picture of a video, determining, based on flag data associated with the picture, whether the picture is a gradual decoding refresh (GDR) picture; based on a determination that the picture is a GDR picture, determining a first region and a second region for the picture using a virtual boundary; disabling a loop filter on a first pixel in the first region when filtering the first pixel uses information of a second pixel in the second region, or applying the loop filter on the first pixel only using information of pixels in the first region; and applying the loop filter on pixels in the second region using pixels in at least one of the first region or the second region.

In yet another aspect, an apparatus is provided. The apparatus includes a memory configured to store a set of instructions and one or more processors communicatively coupled to the memory and configured to execute the set of instructions to cause the apparatus to perform: in response to receiving a video sequence, encoding first flag data in a parameter set associated with the video sequence, wherein the first flag data represents whether gradual decoding refresh (GDR) is enabled or disabled for the video sequence; when the first flag data represents that the GDR is disabled for the video sequence, encoding a picture header associated with a picture in the video sequence to indicate that the picture is a non-GDR picture; and encoding the non-GDR picture.

In yet another aspect, an apparatus is provided. The apparatus includes a memory configured to store a set of instructions and one or more processors communicatively coupled to the memory and configured to execute the set of instructions to cause the apparatus to perform: in response to receiving a video bitstream, decoding first flag data in a parameter set associated with a sequence of the video bitstream, wherein the first flag data represents whether gradual decoding refresh (GDR) is enabled or disabled for the video sequence; when the first flag data represents that the GDR is disabled for the sequence, decoding a picture header associated with a picture in the sequence, wherein the picture header indicates that the picture is a non-GDR picture; and decoding the non-GDR picture.

In yet another aspect, an apparatus is provided. The apparatus includes a memory configured to store a set of instructions and one or more processors communicatively coupled to the memory and configured to execute the set of instructions to cause the apparatus to perform: in response to receiving a picture of a video, determining, based on flag data associated with the picture, whether the picture is a gradual decoding refresh (GDR) picture; based on a determination that the picture is a GDR picture, determining a first region and a second region for the picture using a virtual boundary; disabling a loop filter on a first pixel in the first region when filtering the first pixel uses information of a second pixel in the second region, or applying the loop filter on the first pixel only using information of pixels in the first region; and applying the loop filter on pixels in the second region using pixels in at least one of the first region or the second region.

In yet another aspect, a method is provided. The method includes: in response to receiving a video sequence, encoding first flag data in a parameter set associated with the video sequence, wherein the first flag data represents whether gradual decoding refresh (GDR) is enabled or disabled for the video sequence; when the first flag data represents that the GDR is disabled for the video sequence, encoding a picture header associated with a picture in the video sequence to indicate that the picture is a non-GDR picture; and encoding the non-GDR picture.

In yet another aspect, a method is provided. The method includes: in response to receiving a video bitstream, decoding first flag data in a parameter set associated with a sequence of the video bitstream, wherein the first flag data represents whether gradual decoding refresh (GDR) is enabled or disabled for the video sequence; when the first flag data represents that the GDR is disabled for the sequence, decoding a picture header associated with a picture in the sequence, wherein the picture header indicates that the picture is a non-GDR picture; and decoding the non-GDR picture.

In yet another aspect, a method is provided. The method includes: in response to receiving a picture of a video, determining, based on flag data associated with the picture, whether the picture is a gradual decoding refresh (GDR) picture; based on a determination that the picture is a GDR picture, determining a first region and a second region for the picture using a virtual boundary; disabling a loop filter on a first pixel in the first region when filtering the first pixel uses information of a second pixel in the second region, or applying the loop filter on the first pixel only using information of pixels in the first region; and applying the loop filter on pixels in the second region using pixels in at least one of the first region or the second region.

BRIEF DESCRIPTION OF THE DRAWINGS

Embodiments and various aspects of present disclosure are illustrated in the following detailed description and the accompanying figures. Various features shown in the figures are not drawn to scale.

FIG. 6 illustrates Table 1 showing an example syntax structure of a Sequence Parameter Set (SPS) that enables GDR, consistent with some embodiments of this disclosure.

FIG. 7 illustrates Table 2 showing an example syntax structure of a picture header that enables GDR, consistent with some embodiments of this disclosure.

FIG. 8 illustrates Table 3 showing an example syntax structure of an SPS that enables virtual boundary, consistent with some embodiments of this disclosure.

FIG. 9 illustrates Table 4 showing an example syntax structure of a picture header that enables virtual boundary, consistent with some embodiments of this disclosure.

FIG. 10 illustrates Table 5 showing an example syntax structure of a modified picture header, consistent with some embodiments of this disclosure.

FIG. 11 illustrates Table 6 showing an example syntax structure of a modified SPS that enables virtual boundary, consistent with some embodiments of this disclosure.

FIG. 12 illustrates Table 7 showing an example syntax structure of a modified picture header that enables virtual boundary, consistent with some embodiments of this disclosure.

DETAILED DESCRIPTION

Figure 1:
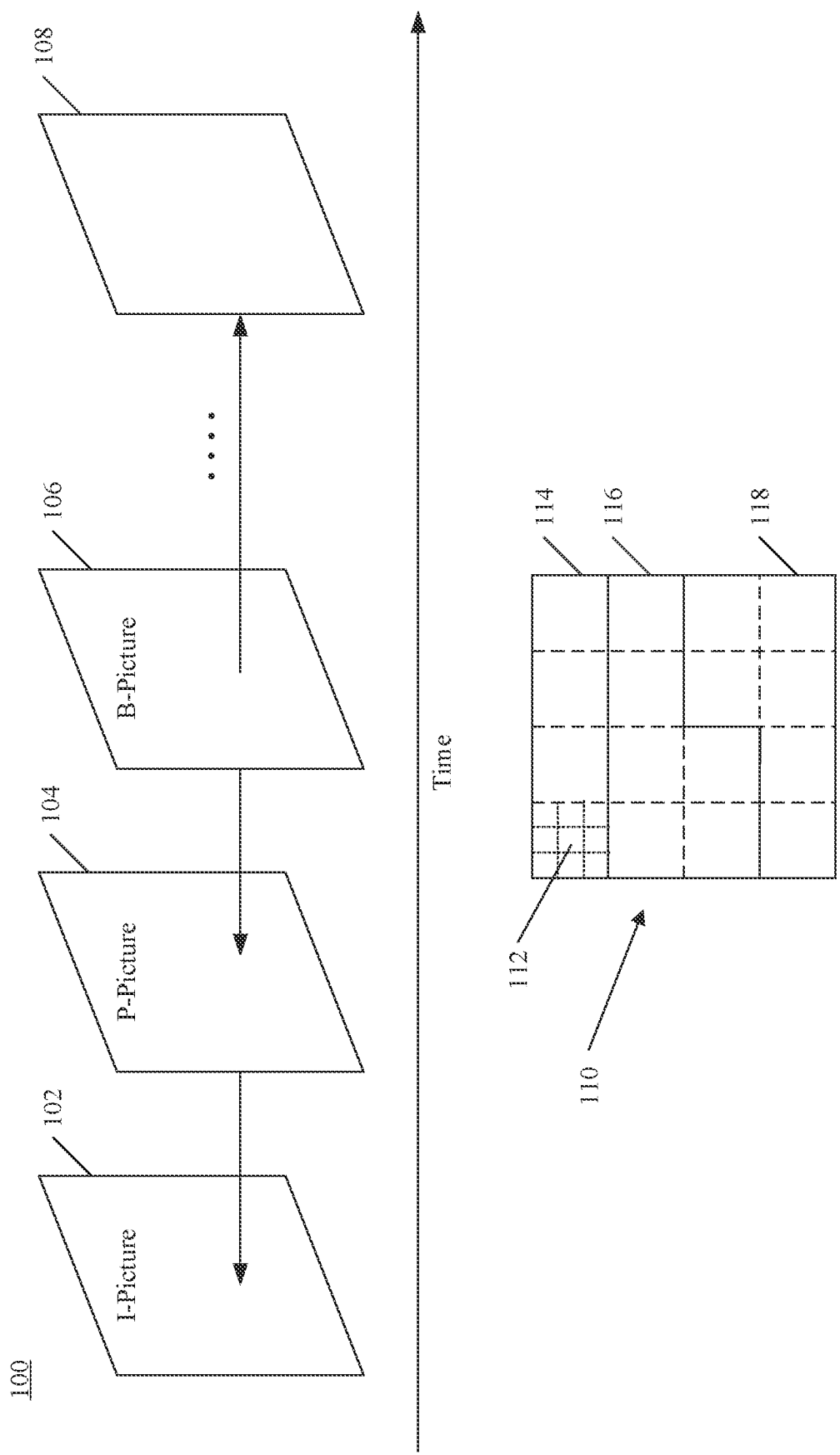
FIG. 1 is a schematic diagram illustrating structures of an example video sequence, consistent with some embodiments of this disclosure.

Reference can now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims. Particular aspects of present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a trade-off to reduce the needed storage space and the transmission bandwidth.

The useful information of a picture being encoded (referred to as a "current picture" or "target picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the target picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, consistent with some embodiments of this disclosure.

Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
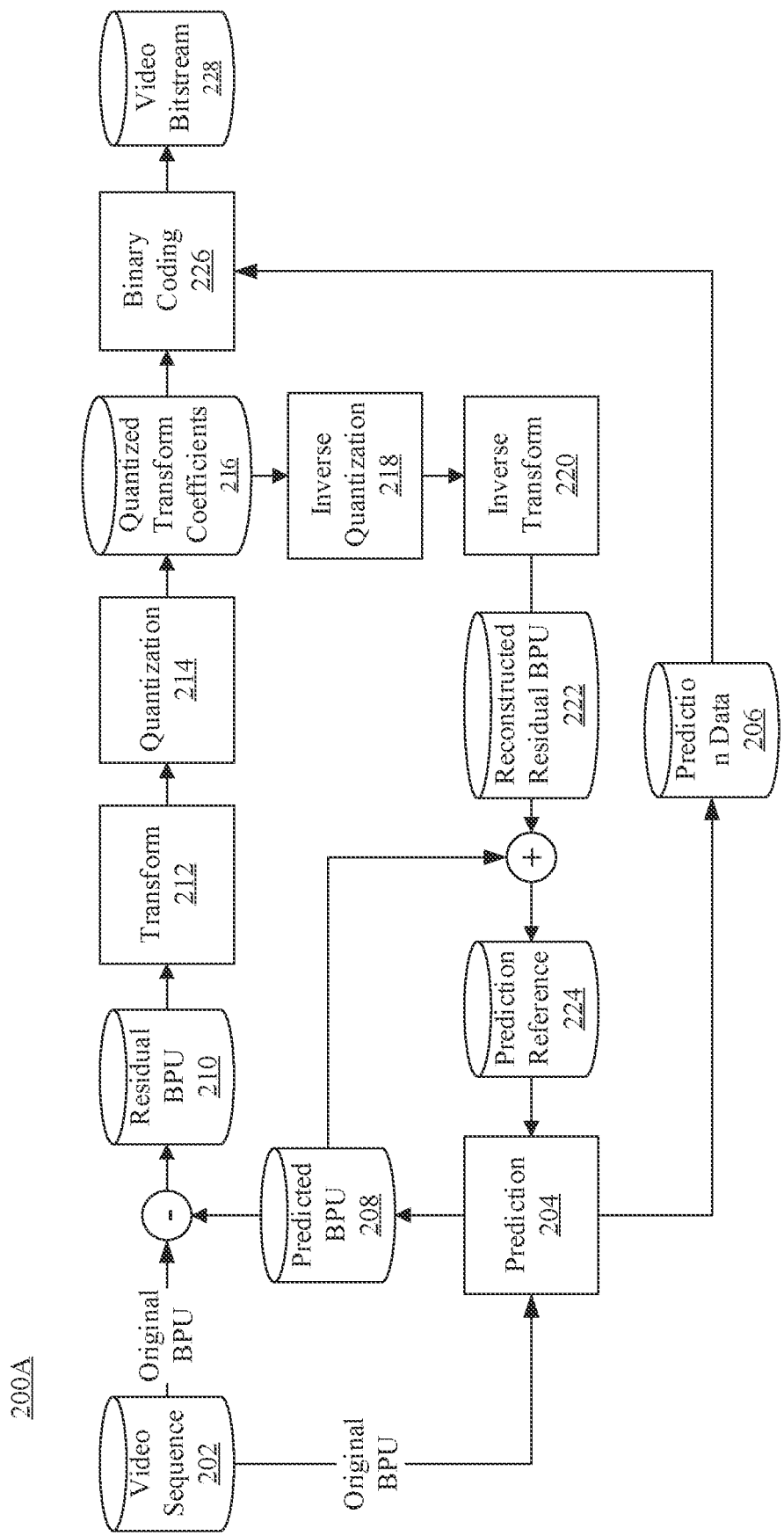
FIG. 2A illustrates a schematic diagram of an example encoding process of a hybrid video coding system, consistent with embodiments of the disclosure.
Figure 2B:
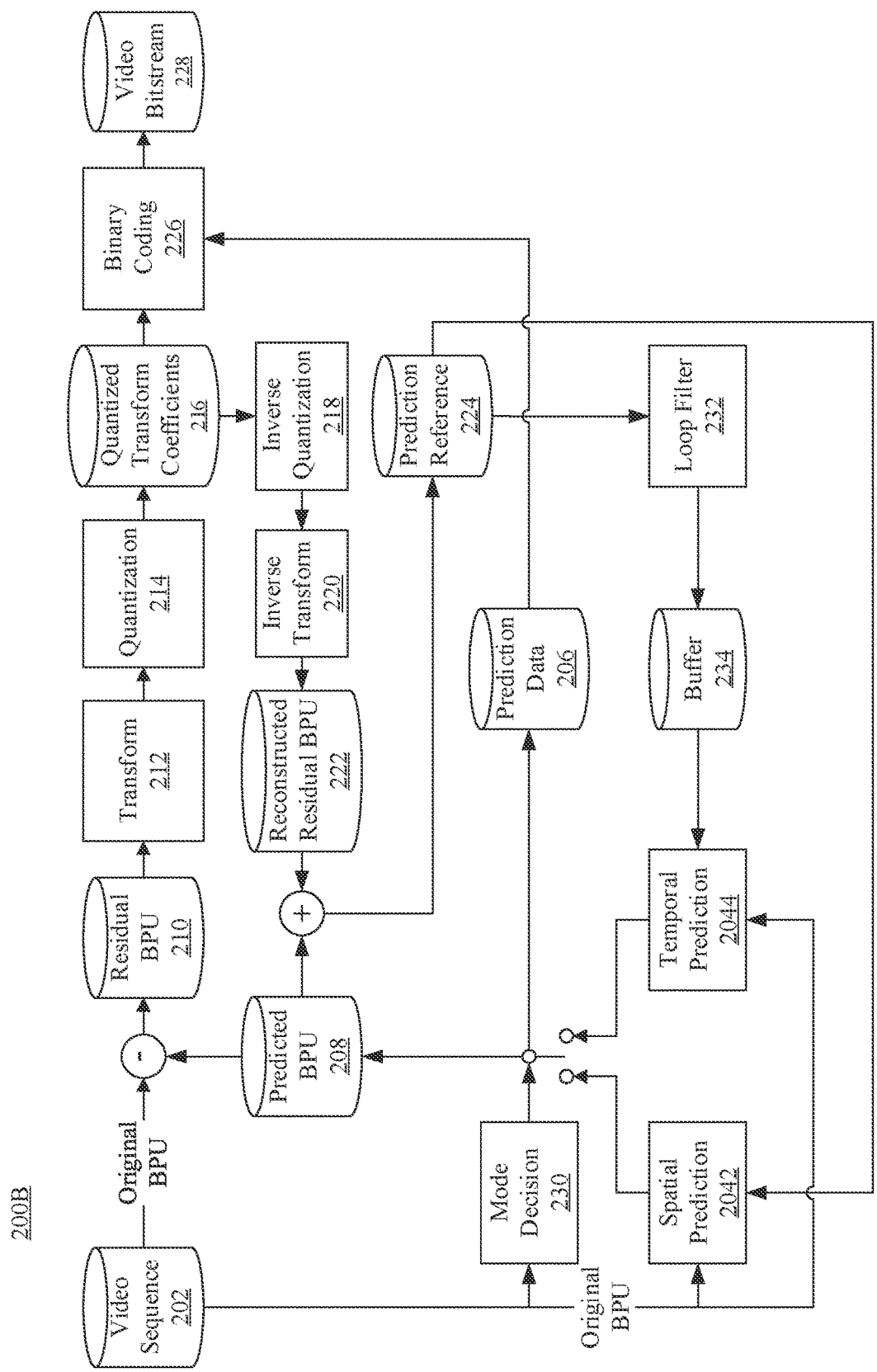
FIG. 2B illustrates a schematic diagram of another example encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the target BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the target BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a target picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the target picture. For example, the search window can be centered at a location having the same coordinates in the reference picture as the original BPU in the target picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the target picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the target picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the target picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the target picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the target BPU that has been encoded and reconstructed in the target picture), the encoder can directly feed prediction reference 224 to spatial prediction stage 2042 for later usage (e.g., for extrapolation of a next BPU of the target picture). If the inter prediction mode has been selected in the forward path, after generating prediction reference 224 (e.g., the target picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
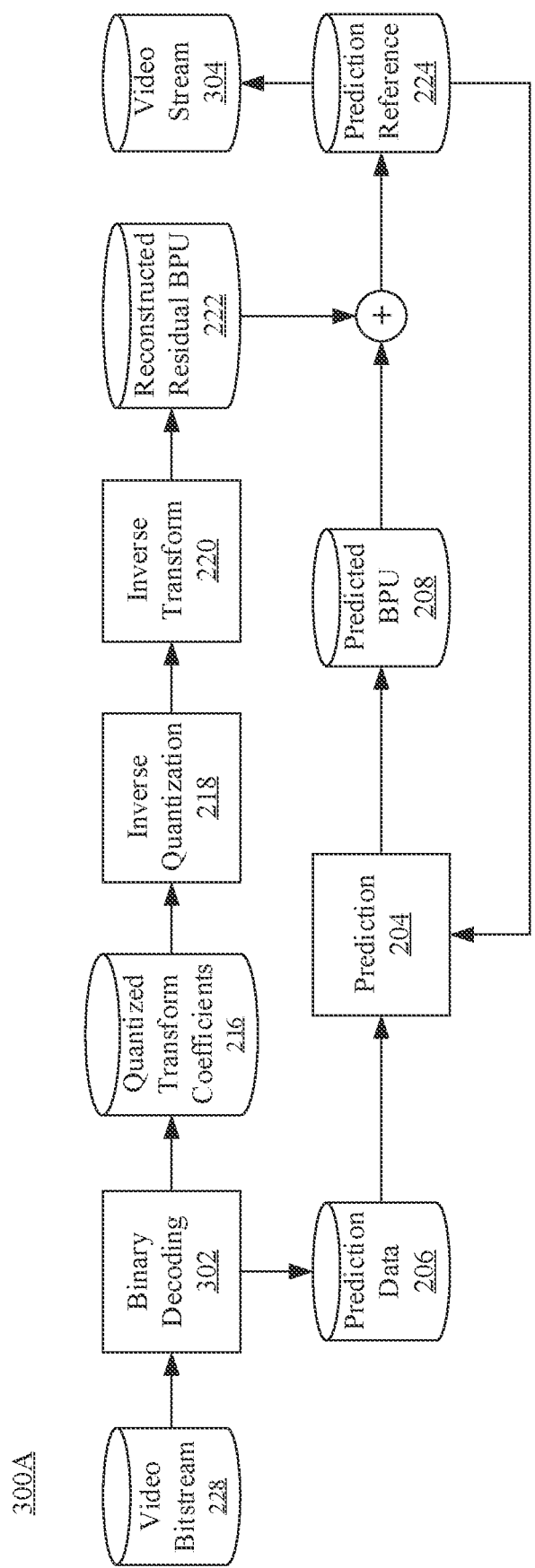
FIG. 3A illustrates a schematic diagram of an example decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
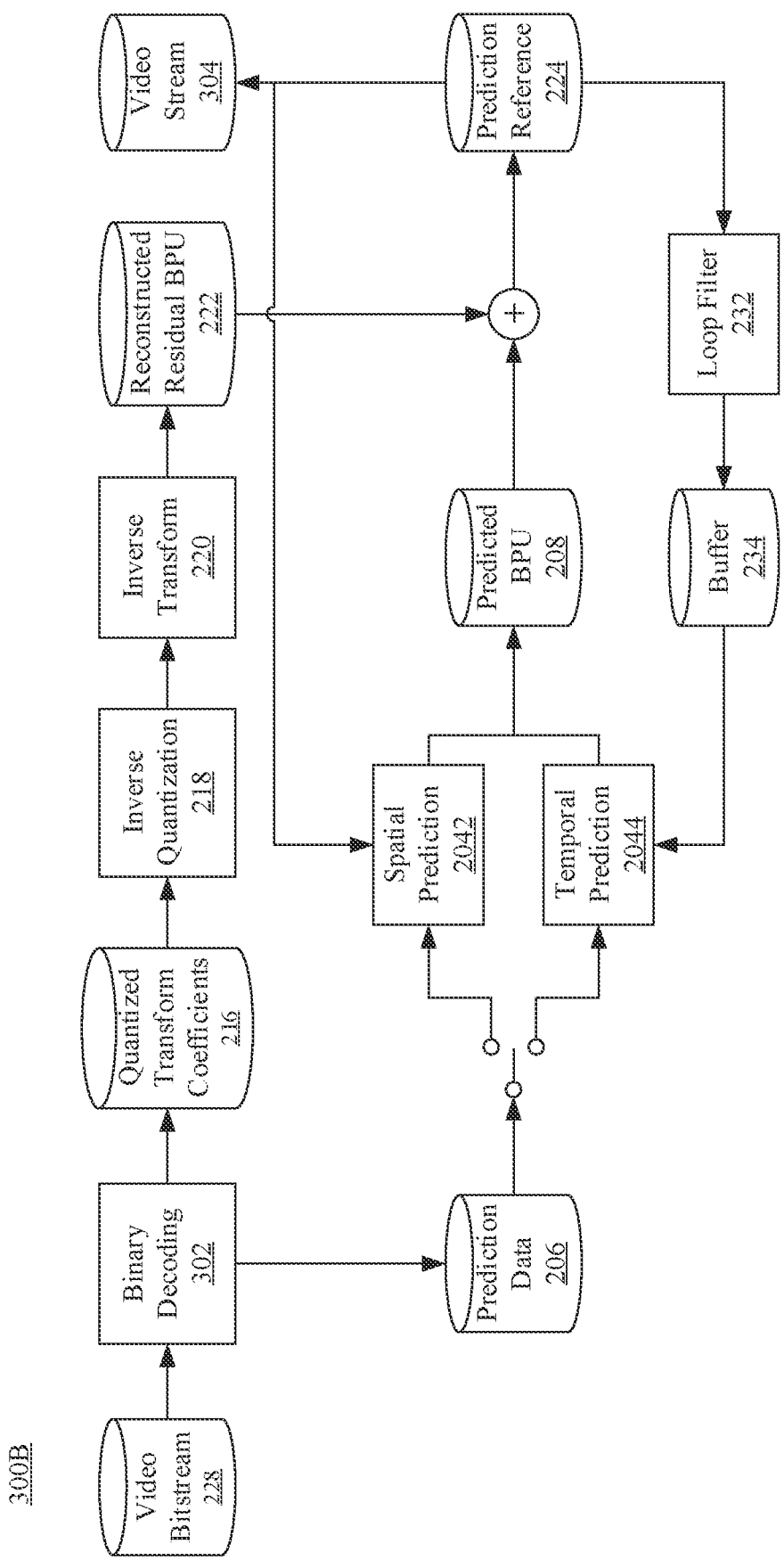
FIG. 3B illustrates a schematic diagram of another example decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU" or "target BPU") of an encoded picture (referred to as a "current picture" or "target picture") that is being decoded, prediction data 206 decoded from binary decoding stage 302 by the decoder can include various types of data, depending on what prediction mode was used to encode the target BPU by the encoder. For example, if intra prediction was used by the encoder to encode the target BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the target BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the target BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the target BPU is decoded using the intra prediction at spatial prediction stage 2042, after generating prediction reference 224 (e.g., the decoded target BPU), the decoder can directly feed prediction reference 224 to spatial prediction stage 2042 for later usage (e.g., for extrapolation of a next BPU of the target picture). If the target BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the target BPU, prediction data can further include parameters of the loop filter (e.g., a loop filter strength).

Figure 4:
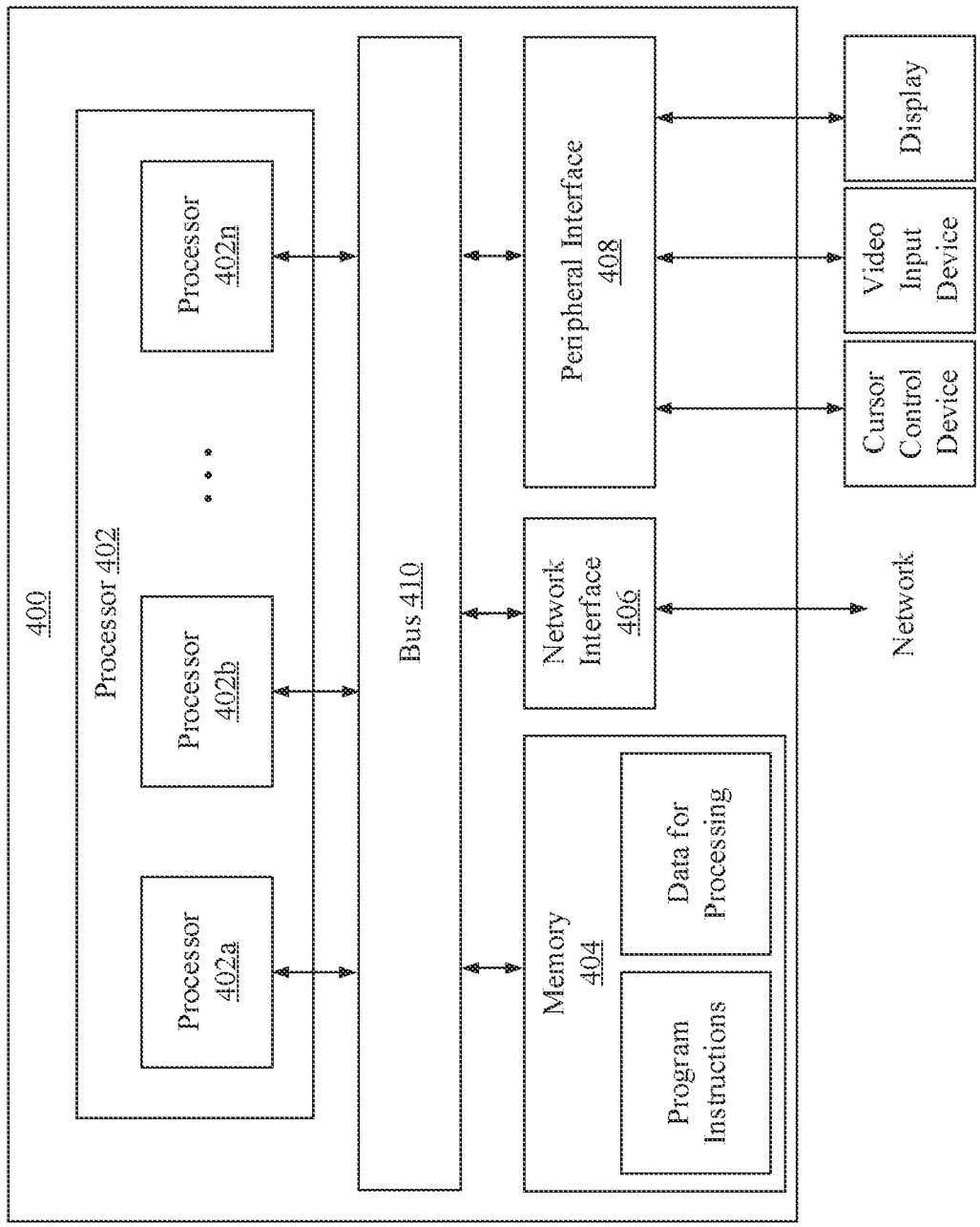
FIG. 4 illustrates a block diagram of an example apparatus for encoding or decoding a video, consistent with some embodiments of this disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

In some real-time applications (e.g., a video conference or a remote operation system), latency of a system can be a critical issue that significantly influences user experience and reliability of the system. For example, ITU-T G.114 specifies that the acceptable upper limit for the latency is 150 milliseconds for bi-directional audio-video communication. In another example, virtual reality applications typically require ultra-low latency to be less than 20 milliseconds to avoid motion sickness caused by timing discrepancy between the head movement and the visual effect caused by the movement.

In a real-time video application system, the total latency includes a time period from a time when a frame is captured to a time when it is displayed. That is, the total latency is a sum of encoding time at an encoder, transmission time in a transmission channel, decoding time at a decoder, and an output delay at the decoder. Generally, the transmission time contributes the most to the total latency. The transmission time of a coded picture is typically equal to the capacity of the coded picture buffer (CPB) divided by a bitrate of the video sequence.

In the present disclosure, "random access" refers to the ability to start a decoding process at any random access point of a video sequence or stream and to recover decoded pictures that are correct in content. To support random access and to prevent error propagation, an intra coded random access point (TRAP) picture can be periodically inserted in the video sequence. However, for high coding efficiency, the size of a coded I-picture (e.g., an IRAP picture) is typically larger than that of a P- or B-picture. The larger size of an TRAP picture can introduce a transmission delay higher than an average transmission delay. Thus, periodically inserting IRAP pictures may not satisfy the requirement of a low-delay video application.

Consistent with the disclosed embodiments, a gradual decoding refresh (GDR) technique, also termed as a progressive intra refresh (PIR) technique, can be used to reduce the latency caused by inserting the TRAP pictures while enabling the random access in the video sequence for low-delay coding. The GDR can refresh the pictures progressively by dispersing intra-coded regions into non-intra-coded pictures (e.g., B- or P-pictures). By doing so, the sizes of the hybrid-coded pictures can be similar to each other, by which the size of the CPB can be reduced or minimized (e.g., to a value equal to the bitrate of the video sequence divided by the picture rate), and the encoding time and decoding time in the total delay can be reduced.

Figure 5:
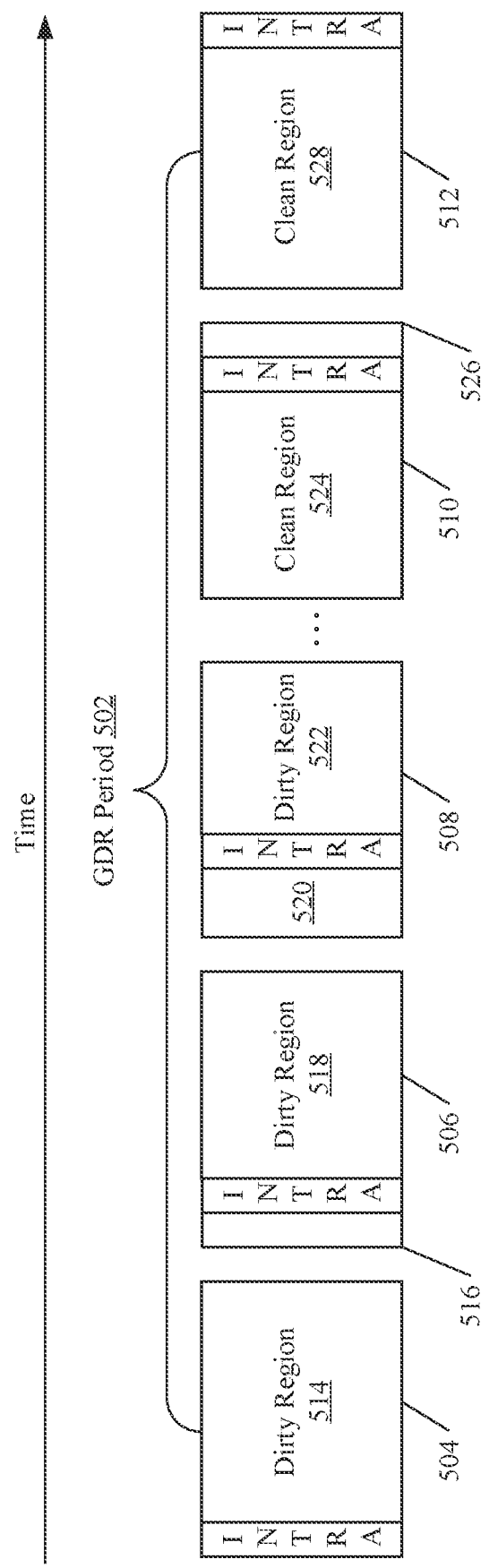
FIG. 5 is a schematic diagram illustrating an example operation of gradual decoding refresh (GDR), consistent with some embodiments of this disclosure.

By way of example, FIG. 5 is a schematic diagram illustrating an example operation of gradual decoding refresh (GDR), consistent with some embodiments of this disclosure. FIG. 5 shows a GDR period 502 that includes multiple pictures (e.g., pictures 504, 506, 508, 510, and 512) in a video sequence (e.g., video sequence 100 in FIG. 1). The first picture in GDR period 502 is referred to as a GDR picture 504 that can be a random-access picture, and the last picture in GDR period 502 is referred to as a recovery point picture 512. Each picture in GDR period 502 includes an intra-coded region (represented by vertical boxes labeled as "INTRA" in each picture of FIG. 5). Each intra-coded region can cover different portions of a full picture. As shown in FIG. 5, the intra-coded regions can progressively cover a full picture in GDR period 502. It should be noted that, although the intra-coded regions are shown as rectangular slices in FIG. 5, they can be implemented as various shapes and sizes and are not limited by the examples described in this disclosure.

Divided by the intra-coded region, a picture (e.g., any of pictures 506-510) other than GDR picture 504 and recovery point picture 512 in GDR period 502 can include two regions, a "clean region" that includes pixels already refreshed and a "dirty region" that includes pixels possibly corrupted due to transmission errors in previous pictures and not been refreshed yet (e.g., which can be refreshed in subsequent pictures). A clean region of a current picture (e.g., picture 510) can include pixels reconstructed using at least one of clean regions or the intra-coded regions of previous pictures (e.g., pictures 508, 506, and GDR picture 504) as references. A clean region of a current picture (e.g., picture 510) can include pixels reconstructed using at least one of dirty regions, clean regions, or the intra-coded regions of previous pictures (e.g., pictures 508, 506, and GDR picture 504) as references.

The principle of the GDR technique is to ensure that pixels in a clean region are reconstructed without using any information from any dirty region (e.g., a dirty region of the current picture or any previous picture). By way of example, in FIG. 5, GDR picture 504 includes a dirty region 514. Picture 506 includes a clean region 516 that can be reconstructed using the intra-coded region of GDR picture 504 as reference and a dirty region 518 that can be reconstructed using any portion (e.g., at least one of the intra-coded region or dirty region 514) of GDR picture 504 as reference. Picture 508 includes a clean region 520 that can be reconstructed using at least one of the intra-coded regions (e.g., the intra-coded regions of pictures 504 or 506) or clean regions (e.g., clean region 516) of picture 504-506 as reference and a dirty region 522 that can be reconstructed using at least one of a portion (e.g., the intra-coded region or dirty region 514) of GDR picture 504 or a portion (e.g., clean region 516, the intra-coded region, or dirty region 518) of picture 506 as reference. Picture 510 includes a clean region 524 that can be reconstructed using at least one of the intra-coded regions (e.g., the intra-coded regions of pictures 504, 506, or 508) or clean regions (e.g., clean regions 516 or 520) of picture 504-508 as reference and a dirty region 526 that can be reconstructed using at least one of a portion (e.g., the intra-coded region or dirty region 514) of GDR picture 504, a portion (e.g., clean region 516, the intra-coded region, or dirty region 518) of picture 506, or a portion (e.g., clean region 520, the intra-coded region, or dirty region 522) of picture 508 as reference. Recovery point picture 512 includes a clean region 528 that can be reconstructed using at least one of a portion (e.g., the intra-coded region or dirty region 514) of GDR picture 504, a portion (e.g., clean region 516, the intra-coded region, or dirty region 518) of picture 506, a portion (e.g., clean region 520, the intra-coded region, or dirty region 522) of picture 508, or a portion (e.g., clean region 524, the intra-coded region, or dirty region 526) of picture 510 as reference.

As illustrated, all pixels of recovery point picture 512 are refreshed. Decoding a picture following recovery point picture 512 in an output order using the GDR technique can be equivalent to decoding the picture using an TRAP picture (as if it exists) preceding GDR picture 504, in which the IRAP picture covers all intra-coded regions of pictures 504-512.

By way of example, FIG. 6 illustrates Table 1 showing an example syntax structure of a Sequence Parameter Set (SPS) that enables GDR, consistent with some embodiments of this disclosure. As shown in Table 1, a sequence-level enabling flag of GDR "gdr_enabled_flag" can be signaled in an SPS of a video sequence to indicate whether any GDR-enabled picture (e.g., any picture in GDR period 502 in FIG. 5) is present in the video sequence. In some embodiments, in a VVC/H.266 standard, "gdr_enabled_flag" being true (e.g., equal to "1") can specify that GDR-enabled pictures are present in a coded layer video sequence (CLVS) referring to the SPS, and "gdr_enabled_flag" being false (e.g., equal to "0") can specify that no GDR-enabled picture is present in the CLVS.

By way of example, FIG. 7 illustrates Table 2 showing an example syntax structure of a picture header that enables GDR, consistent with some embodiments of this disclosure. As shown in Table 2, for a picture of a video sequence, a picture-level enabling flag of GDR "gdr_pic_flag" can be signaled in a picture header of the picture to indicate whether the picture is GDR-enabled (e.g., being any picture in GDR period 502 in FIG. 5). If the picture is GDR-enabled, then a parameter "recovert_poc_cnt" can be signaled to specify a recovery point picture (e.g., recovery point picture 512 in FIG. 5) in an output order. In some embodiments, in a VVC/H.266 standard, "gdr_pic_flag" being true (e.g., equal to "1") can specify that the picture associated with the picture header is a GDR-enabled picture, and "gdr_pic_flag" being false (e.g., equal to "0") can specify that the picture associated with the picture header is not a GDR-enabled picture.

As an example, in a VVC/H.266 standard, when "gdr_enabled_flag" as illustrated in Table 1 is true and a parameter "PicOrderCntVal" (not shown in FIG. 7) of a current picture is greater than or equal to "PicOrderCntVal" plus "recovery_poc_cnt" of the GDR-enabled picture (or GDR-enabled pictures) associated with the current picture, the current picture and subsequent pictures in an output order can be decoded as if they are decoded using by starting the decoding process from an TRAP picture preceding the GDR-enabled picture (or GDR-enabled pictures).

Consistent with some embodiments of this disclosure, a virtual boundary technique can be used to implement the GDR (e.g., in a VVC/H.266 standard). In some applications (e.g., 360-degree videos), the layout for a specific projection format can typically have multiple faces. When those projection formats include a plurality of faces, regardless what kind of compact frame packing arrangement is used, discontinuities can appear between two or more adjacent faces in the frame packed picture. If in-loop filtering operations are performed across this discontinuity, face seam artifacts can become visible in the reconstructed video after rendering.

To alleviate face seam artifacts, in-loop filtering operations (e.g., deblocking filtering, sample adaptive offset filtering, or adaptive loop filtering) can be disabled across discontinuities in frame-packed pictures, which can be referred to as a virtual boundary technique (e.g., a concept as adopted by VVC draft 7). For example, an encoder can set a discontinued boundary as a virtual boundary and disable any loop filtering operation across the virtual boundary. By doing so, loop filtering across discontinuities can be disabled.

In a case of GDR, no loop filtering operation should be applied across the boundary between a clean region (e.g., clean region 520 of picture 508 in FIG. 5) and a dirty region (e.g., dirty region 522 of picture 508). The encoder can set the boundary between the clean region and the dirty region as a virtual boundary and disable the loop filtering operations across the virtual boundary. By doing so, the virtual boundary can be used as a way to implement GDR.

In some embodiments, in a VVC/H.266 standard (e.g., in VVC draft 7), a virtual boundary can be signaled at an SPS or a picture header. By way of example, FIG. 8 illustrates Table 3 showing an example syntax structure of an SPS that enables virtual boundary, consistent with some embodiments of this disclosure. FIG. 9 illustrates Table 4 showing an example syntax structure of a picture header that enables virtual boundary, consistent with some embodiments of this disclosure.

As illustrated in Table 3, a sequence-level virtual boundary present flag "sps_virtual_boundaries_present_flag" can be signaled in an SPS. For example, "sps_virtual_boundaries_present_flag" being true (e.g., equal to "1") can specify that information of virtual boundaries is signalled in the SPS, and "sps_virtual_boundaries_present_flag" being false (e.g., equal to "0") can specify that no information of virtual boundaries is signalled in the SPS. When one or more virtual boundaries are signalled in the SPS, the in-loop filtering operations can be disabled across the virtual boundaries in pictures referring to the SPS.

As illustrated in Table 3, if the flag "sps_virtual_boundaries_present_flag" is true, then a number of virtual boundaries (as represented by parameters "sps_num_ver_virtual_boundaries" and "sps_num_hor_virtual_boundaries" in Table 3) and their positions (as represented by arrays "sps_virtual_boundaries_pos_x" and "sps_virtual_boundaries_pos_y" in Table 3) can be signaled in the SPS. The parameters "sps_num_ver_virtual_boundaries" and "sps_num_hor_virtual_boundaries" can specify the length of arrays "sps_virtual_boundaries_pos_x" and "sps_virtual_boundaries_pos_y" in the SPS, respectively. In some embodiments, when "sps_num_ver_virtual_boundaries" (or "sps_num_hor_virtual_boundaries") is not present in the SPS, its value can be inferred to be 0. The arrays "sps_virtual_boundaries_pos_x" and "sps_virtual_boundaries_pos_y" can specify the location of the i-th vertical or horizontal virtual boundary in units of luma samples divided by 8, respectively. For example, values of "sps_virtual_boundaries_pos_x[i]" can be in a closed interval of 1 to Ceil(pic_width_in_luma_samples÷8)−1, in which "Ceil" represents a ceiling function, and "pic_width_in_luma_samples" is a parameter representing a width of the picture in units of luma samples. Values of "sps_virtual_boundaries_pos_y[i]" can be in a closed interval of 1 to Ceil(pic_height_in_luma_samples÷8)−1, in which "pic_height_in_luma_samples" is a parameter representing a height of the picture in units of luma samples.

In some embodiments, if the flag "sps_virtual_boundaries_present_flag" is false (e.g., equal to "0"), then a picture-level virtual boundary present flag "ph_virtual_boundaries_present_flag" can be signaled in a picture header, as illustrated in Table 4. For example, "ph_virtual_boundaries_present_flag" being true (e.g., equal to "1") can specify that information of virtual boundaries is signalled in the picture header, and "ph_virtual_boundaries_present_flag" being false (e.g., equal to "0") can specify that no information of virtual boundaries is signalled in the picture header. When one or more virtual boundaries are signalled in the picture header, the in-loop filtering operations can be disabled across the virtual boundaries in the picture that includes the picture header. In some embodiments, when "ph_virtual_boundaries_present_flag" is not present in the picture header, its value can be inferred to represent "false."

As illustrated in Table 4, if the flag "ph_virtual_boundaries_present_flag" is true (e.g., equal to "1"), then a number of virtual boundaries (as represented by parameters "ph_num_ver_virtual_boundaries" and "ph_num_hor_virtual_boundaries" in Table 4) and their positions (as represented by arrays "ph_virtual_boundaries_pos_x" and "ph_virtual_boundaries_pos_y" in Table 4) can be signaled in the picture header. The parameters "ph_num_ver_virtual_boundaries" and "ph_num_hor_virtual_boundaries" can specify the length of arrays "ph_virtual_boundaries_pos_x" and "ph_virtual_boundaries_pos_y" in the picture header, respectively. In some embodiments, when "ph_virtual_boundaries_pos_x" (or "ph_virtual_boundaries_pos_y") is not present in the picture header, its value can be inferred to be 0. The arrays "ph_virtual_boundaries_pos_x" and "ph_virtual_boundaries_pos_y" can specify the location of the i-th vertical or horizontal virtual boundary in units of luma samples divided by 8, respectively. For example, values of "ph_virtual_boundaries_pos_x[i]" can be in a closed interval of 1 to Ceil(pic_width_in_luma_samples÷8)−1, and values of "ph_virtual_boundaries_pos_y [i]" can be in a closed interval of 1 to Ceil(pic_height_in_luma_samples÷8)−1, in which "pic_height_in_luma_samples" is a parameter representing a height of the picture in units of luma samples.

In some embodiments, in a VVC/H.266 standard (e.g., in VVC draft 7), a variable "VirtualBoundariesDisabledFlag" can be defined as Eq. (1):

VirtualBoundariesDisabledFlag=sps_virtual_boundaries_present_flag||ph_virtual_boundaries_present_flag  Eq. (1)

However, in the implementation of GDR by using virtual boundaries, two problems can occur in the existing technical solutions. For example, as described above, the picture-level flag "gdr_pic_flag" is always signaled in picture headers regardless of the value of the Sequence-level flag "gdr_enabled_flag" in the existing technical solutions. That is, even when the GDR is disabled for a sequence, a picture header of each picture of the sequence can still indicate whether the picture is GDR-enabled. Therefore, contradiction can occur at the SPS level and the picture level. For example, if "gdr_enabled_flag" is false, contradiction can occur if "gdr_pic_flag" is true.

As another example, when using a virtual boundary as the boundary of clean regions and dirty regions to implement the GDR, no loop filtering operation is applied across the virtual boundary in the existing technical solutions. However, as the requirement of GDR, decoding pixels in a clean region cannot refer to pixels in a dirty region, but decoding the pixels in the dirty region can refer to the pixels in the clean region. In such a case, completely disabling the loop filtering operation across the virtual boundary can impose an overly strict restriction, which can deteriorate encoding or decoding performance.

To solve the above problems, this disclosure provides methods, apparatuses, and systems for processing pictures. Consistent with some embodiments of this disclosure, to eliminate potential contradiction of GDR indication flags at the SPS level and the picture level, a syntax structure of a picture header can be modified such that a picture-level GDR indication flag can be signaled only when the GDR is enabled at a sequence level.

By way of example, FIG. 10 illustrates Table 5 showing an example syntax structure of a modified picture header, consistent with some embodiments of this disclosure. As illustrated in Table 5, element 1002 (enclosed by a solid line box) shows the syntax modifications compared with Table 2 in FIG. 7. For example, "gdr_pic_flag" being true (e.g., equal to "1") can specify that the picture associated with the picture header is a GDR-enabled picture, and "gdr_pic_flag" being false (e.g., equal to "0") can specify that the picture associated with the picture header is not a GDR-enabled picture. In some embodiments, if "gdr_pic_flag" is not present in the picture header, its value can be inferred to represent "false."

Consistent with some embodiments of this disclosure, to eliminate potential contradiction of GDR indication flags at the SPS level and the picture level, the syntax structure of the picture header can be maintained as unchanged (e.g., as shown in Table 2 of FIG. 7), and a bitstream conformance requirement (e.g., the bitstream conformance as defined in a VVC/H.266 standard) can be implemented such that the picture-level GDR indication flag will not be true (e.g., being disabled or false) when the sequence-level GDR indication flag is not true (e.g., being disabled or false). A bitstream conformance requirement, as used herein, can refer to operations that can ensure a bitstream subset associated with an operation point conforms to a video coding standard (e.g., a VVC/H.266 standard). An "operation point" can refer to a first bitstream created from a second bitstream by an sub-bitstream extraction process in which network abstraction layer (NAL) units of the second bitstream can be removed if they do not belong to a target set determined by a target temporal identifier and a target layer identifier list. For example, the bitstream conformance requirement can be implemented as that, when "gdr_enabled_flag" is false, "gdr_pic_flag" is also set to be false.

Consistent with some embodiments of this disclosure, to provide higher flexibility in disabling the loop filtering operation across the virtual boundary, the syntax structures of the SPS and the picture header can be modified such that the loop filtering operation across the virtual boundary can be partially disabled. By doing so, pixels on one side of a virtual boundary can be unfiltered but pixels on the other side of the virtual boundary can be filtered. For example, if a virtual boundary vertically splits a picture into a left side and a right side, an encoder or decoder partially can disable a loop filter on the right side where the pixels is unfiltered (e.g., information of pixels on the left side is not used for loop filtering of pixels on the right side) and enable the loop filter on the left side where the pixels is filtered (e.g., information of the pixels on at least one of the left side or the right side can be used for the loop filtering).

By way of example, FIG. 11 illustrates Table 6 showing an example syntax structure of a modified SPS that enables virtual boundary, consistent with some embodiments of this disclosure. FIG. 12 illustrates Table 7 showing an example syntax structure of a modified picture header that enables virtual boundary, consistent with some embodiments of this disclosure. As illustrated in the accompanying figures of this disclosure, a dot-dash line box represents that the contents or elements enclosed therein are deleted or removed (shown as been stricken through). As illustrated in FIGS. 11-12, the sequence-level GDR indication flag "sps_virtual_boundaries_present_flag" and the picture-level GDR indication flag "ph_virtual_boundaries_present_flag" are replaced by GDR controlling parameters "sps_virtual_boundaries_loopfilter_disable" and "ph_virtual_boundaries_loopfilter_disable," respectively, which are extended to support partially disabling loop filtering operations at the sequence level and picture level, respectively.

If a GDR direction (e.g., from left to right, right to left, top to bottom, bottom to top, or any combination thereof) is fixed for an entire sequence, a GDR controlling parameter (e.g., "sps_virtual_boundaries_loopfilter_disable") can be set in the SPS, which can save bits. If the GDR direction needs to be changed within the sequence, a GDR controlling parameter (e.g., "ph_virtual_boundaries_loopfilter_disable") can be set in the picture header, which can provide higher flexibility of low-level controlling.

Consistent with some embodiments of this disclosure, the GDR controlling parameters "sps_virtual_boundaries_loopfilter_disable" and "ph_virtual_boundaries_loopfilter_disable" can be configured to be multiple values (e.g., beyond representation of "true" or "false") to represent different implementation schemes.

For example, "sps_virtual_boundaries_loopfilter_disable" being "0" can specify that no information of virtual boundaries is signalled in the SPS. "sps_virtual_boundaries_loopfilter_disable" being "1" can specify that information of virtual boundaries is signalled in the SPS and in-loop filtering operations are disabled across the virtual boundaries. "sps_virtual_boundaries_loopfilter_disable" being "2" can specify that information of a virtual boundary is signalled in the SPS, and one of: (1) the in-loop filtering operation on a left side of virtual boundary is disabled; (2) the in-loop filtering operation on the left side will not use information of any pixel on a right side of the virtual boundary; (3) the in-loop filtering operation on an upper side of the virtual boundary is disabled; or (4) the in-loop filtering operation on the upper side will not use information of any pixel on a bottom side of the virtual boundary. "sps_virtual_boundaries_loopfilter_disable" being "3" can specify that information of a virtual boundary is signalled in the SPS, and one of: (1) the in-loop filtering operation on the right side of the virtual boundary is disabled; (2) the in-loop filtering operation on the right side will not use information of any pixel on the left side of the virtual boundary; (3) the in-loop filtering operation on the bottom side of the virtual boundary is disabled; or (4) the in-loop filtering operation on the bottom side will not use information of any pixel on the upper side.

Similarly, in another example, "ph_virtual_boundaries_loopfilter_disable" being "0" can specify that no information of virtual boundaries is signalled in the picture header. "ph_virtual_boundaries_loopfilter_disable" being "1" can specify that information of virtual boundaries is signalled in the picture header and in-loop filtering operations are disabled across the virtual boundaries. "ph_virtual_boundaries_loopfilter_disable" being "2" can specify that information of a virtual boundary is signalled in the picture header, and one of: (1) the in-loop filtering operation on a left side of virtual boundary is disabled; (2) the in-loop filtering operation on the left side will not use information of any pixel on a right side of the virtual boundary; (3) the in-loop filtering operation on an upper side of the virtual boundary is disabled; or (4) the in-loop filtering operation on the upper side will not use information of any pixel on a bottom side of the virtual boundary. "ph_virtual_boundaries_loopfilter_disable" being "3" can specify that information of a virtual boundary is signalled in the picture header, and one of: (1) the in-loop filtering operation on the right side of the virtual boundary is disabled; (2) the in-loop filtering operation on the right side will not use information of any pixel on the left side of the virtual boundary; (3) the in-loop filtering operation on the bottom side of the virtual boundary is disabled; or (4) the in-loop filtering operation on the bottom side will not use information of any pixel on the upper side. In some embodiments, if "ph_virtual_boundaries_loopfilter_disable" is not present in the picture header, its value can be inferred to be 0.

In some embodiments, a variable "VirtualBoundariesLoopfilterDisabled" can be defined as Eq. (2):

$$\text{VirtualBoundariesLoopfilterDisabled} = \text{sps\_virtual\_boundaries\_loopfilter\_disable} ? \text{sps\_virtual\_boundaries\_loopfilter\_disable} : \text{ph\_virtual\_boundaries\_loopfilter\_disable} \quad \text{Eq. (2)}$$

Consistent with some embodiments of this disclosure, the loop filter can be an adaptive loop filter (ALF). When the ALF is partially disabled on a first side (e.g., a left, right, top, or bottom side), pixels on the first side can be padded in the filtering, and no pixel on a second side (e.g., a right, left, bottom, or top side) is used for the filtering.

In some embodiments, the boundary positions of the ALF can be derived as described below. In the ALF boundary position derivation process, variables "clipLeftPos," "clipRightPos," "clipTopPos," and "clipBottomPos" can be set as "−128."

Compared with a VVC/H.266 standard (e.g., in VVC draft 7), the variable "clipTopPos" can be determined as follows. If (y−(CtbSizeY−4)) is greater than or equal to 0, the variable "clipTopPos" can be set as (yCtb+CtbSizeY−4). If (y−(CtbSizeY−4)) is negative, "VirtualBoundariesLoopfilterDisabled" is equal to 1, and (yCtb+y−VirtualBoundariesPosY[n]) is in a semi-open interval [1, 3) for any n=0, 1, . . . , (VirtualBoundariesNumHor−1), then "clipTopPos" can be set as "VirtualBoundariesPosY[n]" (i.e., clipTopPos=VirtualBoundariesPosY[n]). If (y−(CtbSizeY−4)) is negative, "VirtualBoundariesLoopfilterDisabled" is equal to 3, and (yCtb+y−VirtualBoundariesPosY[n]) is in a semi-open interval [1, 3) for any n=0, 1, . . . , (VirtualBoundariesNumHor−1), then "clipTopPos" can be set as "VirtualBoundariesPosY[n]" (i.e., clipTopPos=VirtualBoundariesPosY[n]).

If (y−(CtbSizeY−4)) is negative, y is less than 3, and one or more of the following conditions are true, then "clipTopPos" can be set as "yCtb": (1) The top boundary of the current coding tree block is the top boundary of the tile, and "loop_filter_across_tiles_enabled_flag" is equal to 0; (2) The top boundary of the current coding tree block is the top boundary of the slice, and "loop_filter_across_slices_enabled_flag" is equal to 0; or (3) The top boundary of the current coding tree block is the top boundary of the subpicture, and "loop_filter_across_subpic_enabled_flag[SubPicIdx]" is equal to 0.

Compared with a VVC/H.266 standard (e.g., in VVC draft 7), the variable "clipBottomPos" can be determined as follows. If "VirtualBoundariesLoopfilterDisabled" is equal to 1, "VirtualBoundariesPosY[n]" is not equal to (pic_height_in_luma_samples−1) or 0, and (VirtualBoundariesPosY[n]−yCtb−y) is in an open interval (0, 5) for any n=0, . . . (VirtualBoundariesNumHor−1), then "clipBottomPos" can be set as "VirtualBoundariesPosY[n]" (i.e., clipBottomPos=VirtualBoundariesPosY[n]).

If "VirtualBoundariesLoopfilterDisabled" is equal to 2, "VirtualBoundariesPosY[n]" is not equal to (pic_height_in_luma_samples−1) or 0, and (VirtualBoundariesPosY[n]−yCtb−y) is in an open interval (0, 5) for any n=0, . . . , (VirtualBoundariesNumHor−1), then "clipBottomPos" can be set as "VirtualBoundariesPosY[n]" (i.e., clipBottomPos=VirtualBoundariesPosY[n]).

Otherwise, if (CtbSizeY−4−y) is in an open interval (0, 5), then "clipBottomPos" can be set as "yCtb+CtbSizeY−4". Otherwise, if (CtbSizeY−y) is less than 5, and one or more of the following conditions are true, then "clipBottomPos" can be set as "(yCtb+CtbSizeY)": (1) The bottom boundary of the current coding tree block is the bottom boundary of the tile, and "loop_filter_across_tiles_enabled_flag" is equal to 0; (2) The bottom boundary of the current coding tree block is the bottom boundary of the slice, and "loop_filter- _across_slices_enabled_flag" is equal to 0; or (3) The bottom boundary of the current coding tree block is the bottom boundary of the subpicture, and "loop_filter_across_subpic_enabled_flag[SubPicIdx]" is equal to 0.

Compared with a VVC/H.266 standard (e.g., in VVC draft 7), the variable "clipLeftPos" can be determined as follows. If "VirtualBoundariesLoopfilterDisabled" is equal to 1, and (xCtb+x−VirtualBoundariesPosX[n]) is in a semi-open interval [1, 3) for any n=0, . . . , (VirtualBoundariesNumVer−1), then "clipLeftPos" can be set as "VirtualBoundariesPosX[n]" (i.e., clipLeftPos=VirtualBoundariesPosX[n]). If "VirtualBoundariesLoopfilterDisabled" is equal to 3, and "xCtb+x−VirtualBoundariesPosX[n]" is in a semi-open interval [1, 3) for any n=0, . . . , (VirtualBoundariesNumVer−1), then "clipLeftPos" can be set as "VirtualBoundariesPosX[n]" (i.e., clipLeftPos=VirtualBoundariesPosX[n]).

Otherwise, if x is less than 3, and one or more of the following conditions are true, then "clipLeftPos" can be set as "xCtb": (1) The left boundary of the current coding tree block is the left boundary of the tile, and "loop_filter_across_tiles_enabled_flag" is equal to 0; (2) The left boundary of the current coding tree block is the left boundary of the slice, and "loop_filter_across_slices_enabled_flag" is equal to 0; (3) The left boundary of the current coding tree block is the left boundary of the subpicture, and "loop_filter_across_subpic_enabled_flag[SubPicIdx]" is equal to 0.

Compared with a VVC/H.266 standard (e.g., in VVC draft 7), the variable "clipRightPos" can be determined as follows. If "VirtualBoundariesLoopfilterDisabled" is equal to 1, and "(VirtualBoundariesPosX[n]−xCtb−x)" is in an open interval (0, 5) for any n=0, . . . , (VirtualBoundariesNumVer−1), then "clipRightPos" can be set as "VirtualBoundariesPosX[n]" (i.e., clipRightPos=VirtualBoundariesPosX[n]). If "VirtualBoundariesLoopfilterDisabled" is equal to 2, and (VirtualBoundariesPosX[n]−xCtb−x) is in an open interval (0, 5) for any n=0, . . . , (VirtualBoundariesNumVer−1), then "clipRightPos" can be set as "VirtualBoundariesPosX[n]" (i.e., clipRightPos=VirtualBoundariesPosX[n]).

Otherwise, if "(CtbSizeY−x)" is less than 5, and one or more of the following conditions are true, then "clipRightPos" can be set as (xCtb+CtbSizeY): (1) The right boundary of the current coding tree block is the right boundary of the tile, and "loop_filter_across_tiless_enabled_flag" is equal to 0; (2) The right boundary of the current coding tree block is the right boundary of the slice, and "loop_filter_across_slices_enabled_flag" is equal to 0; or (3) The right boundary of the current coding tree block is the right boundary of the subpicture, and "loop_filter_across_subpic_enabled_flag[SubPicIdx]" is equal to 0.

Compared with a VVC/H.266 standard (e.g., in VVC draft 7), the variables "clipTopLeftFlag" and "clipBotRightFlag" can be determined as follows. If the coding tree block covering the luma position (xCtb, yCtb) and the coding tree block covering the luma position (xCtb−CtbSizeY, yCtb−CtbSizeY) belong to different slices, and "loop_filter_across_slices_enabled_flag" is equal to 0, then "clipTopLeftFlag" can be set as 1. If the coding tree block covering the luma position (xCtb, yCtb) and the coding tree block covering the luma position (xCtb+CtbSizeY, yCtb+CtbSizeY) belong to different slices, and "loop_filter_across_slices_enabled_flag" is equal to 0, then "clipBotRightFlag" can be set as 1.

Consistent with some embodiments of this disclosure, the loop filter can include a sample adaptive offset (SAO) operation. When the SAO is partially disabled on a first side (e.g., a left, right, top, or bottom side) of a virtual boundary, if the SAO on pixels of the first side needs pixels on a second side (e.g., a right, left, bottom, or top side), then the SAO on the pixels of the first side can be skipped from being applied. By doing so, no pixel on the second side can be used.

Consistent with some embodiments of this disclosure, in a CTB modification process, for all sample locations (xSi, ySj) and (xYi, yYj) where i=0, . . . , (nCtbSw−1) and j=0, . . . (nCtbSh−1), the following operations can be applied.

If one or more of the following conditions are true, then the variable "saoPicture[xSi][ySj]" can be unmodified: (1) the variable "SaoTypeIdx[cIdx][rx][ry]" is equal to 0; (2) "VirtualBoundariesLoopfilterDisabled" is equal to 1, "xSj" is equal to ((VirtualBoundariesPosX[n]/scaleWidth)−1) for any n=0, . . . , (VirtualBoundariesNumVer−1), "SaoTypeIdx[cIdx][rx][ry]" is equal to 2, and the variable "SaoEoClass[cIdx][rx][ry]" is not equal to 1; (3) "VirtualBoundariesLoopfilterDisabled" is equal to 1, "xSj" is equal to (VirtualBoundariesPosX[n]/scaleWidth) for any n=0, . . . , (VirtualBoundariesNumVer−1), "SaoTypeIdx[cIdx][rx][ry]" is equal to 2, and "SaoEoClass[cIdx][rx][ry]" is not equal to 1; (4) "VirtualBoundariesLoopfilterDisabled" is equal to 1, "ySj" is equal to ((VirtualBoundariesPosY[n]/scaleHeight)−1) for any n=0, . . . , (VirtualBoundariesNumHor−1), "SaoTypeIdx[cIdx][rx][ry]" is equal to 2, and "SaoEoClass[cIdx][rx][ry]" is not equal to 0; (5) "VirtualBoundariesLoopfilterDisabled" is equal to 1, "ySj" is equal to (VirtualBoundariesPosY[n]/scaleHeight) for any n=0, . . . , (VirtualBoundariesNumHor−1), "SaoTypeIdx[cIdx][rx][ry]" is equal to 2, and "SaoEoClass[cIdx][rx][ry]" is not equal to 0; (6) "VirtualBoundariesLoopfilterDisabled" is equal to 2, "xSj" is equal to ((VirtualBoundariesPosX[n]/scaleWidth)−1) for any n=0, . . . , (VirtualBoundariesNumVer−1), "SaoTypeIdx[cIdx][rx][ry]" is equal to 2, and "SaoEoClass[cIdx][rx][ry]" is not equal to 1; (7) "VirtualBoundariesLoopfilterDisabled" is equal to 3, "xSj" is equal to (VirtualBoundariesPosX[n]/scaleWidth) for any n=0, . . . , (VirtualBoundariesNumVer−1), "SaoTypeIdx[cIdx][rx][ry]" is equal to 2, and "SaoEoClass[cIdx][rx][ry]" is not equal to 1; (8) "VirtualBoundariesLoopfilterDisabled" is equal to 2, "ySj" is equal to ((VirtualBoundariesPosY[n]/scaleHeight)−1) for any n=0, . . . , (VirtualBoundariesNumHor−1), "SaoTypeIdx[cIdx][rx][ry]" is equal to 2, and "SaoEoClass[cIdx][rx][ry]" is not equal to 0; or (9) "VirtualBoundariesLoopfilterDisabled" is equal to 3, "ySj" is equal to (VirtualBoundariesPosY[n]/scaleHeight) for any n=0, . . . , (VirtualBoundariesNumHor−1), "SaoTypeIdx[cIdx][rx][ry]" is equal to 2, and "SaoEoClass[cIdx][rx][ry]" is not equal to 0.

Consistent with some embodiments of this disclosure, the loop filter can include a deblocking filter. In some embodiments, when the deblocking filter is partially disabled on a first side (e.g., a left, right, top, or bottom side) of a virtual boundary, pixels on the first side can be skipped from being processed by the deblocking filter, and pixels on a second side (e.g., a right, left, bottom, or top side) of the virtual boundary can be processed by the deblocking filter. In some embodiments, when "VirtualBoundariesLoopfilterDisabled" is not false (e.g., having a value 0), the deblocking filter can be fully disabled, in which pixels on both sides of the virtual boundary can be skipped from being processed by the deblocking filter.

Figure 13:
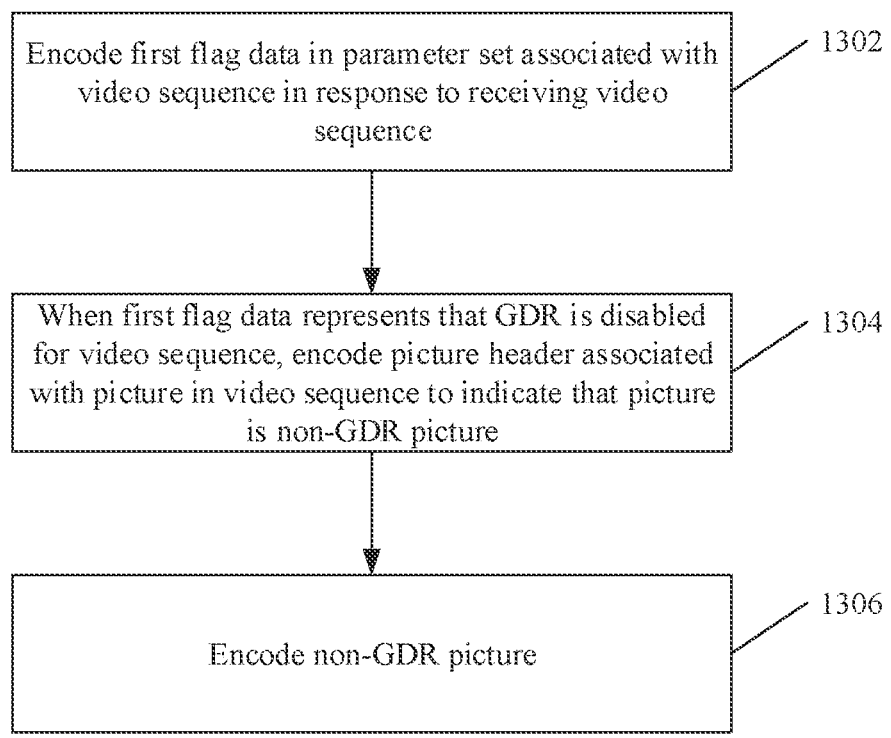
FIG. 13 illustrates a flowchart of an example process for video processing, according to some embodiments of this disclosure.
Figure 14:
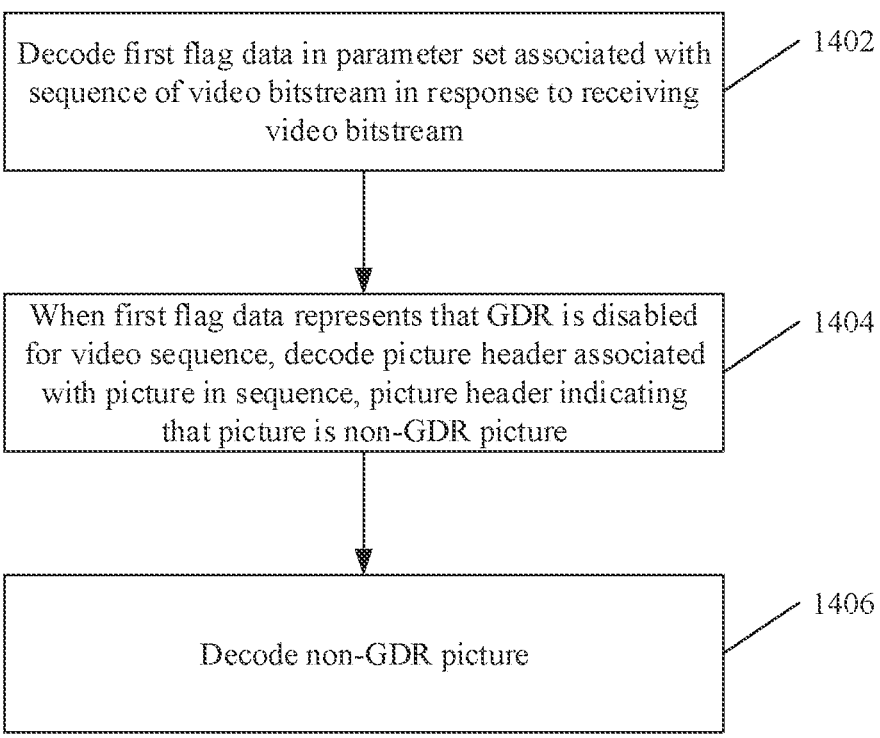
FIG. 14 illustrates a flowchart of another example process for video processing, according to some embodiments of this disclosure.
Figure 15:
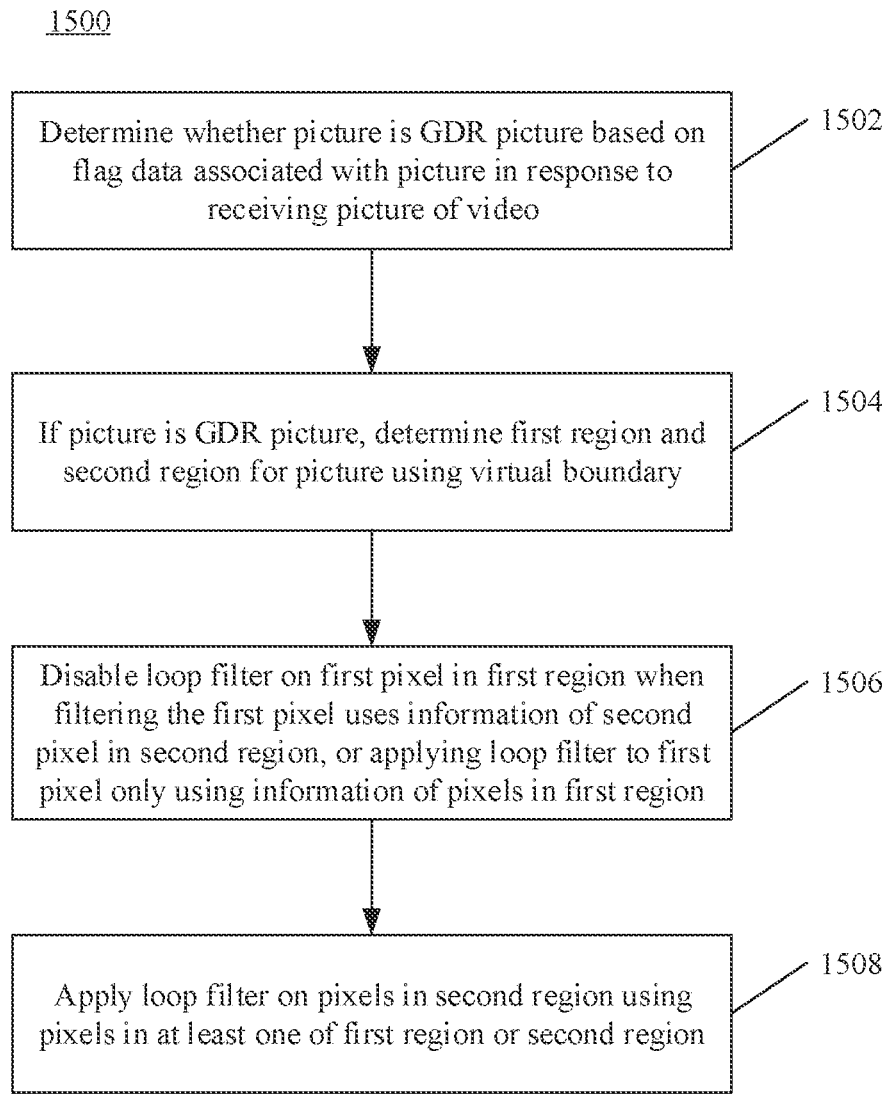
FIG. 15 illustrates a flowchart of yet another example process for video processing, according to some embodiments of this disclosure.

Consistent with some embodiments of this disclosure, FIGS. 13-15 illustrate flowcharts of example methods 1300-1500. Methods 1300-1500 can be performed by at least one processor (e.g., processor 402 in FIG. 4) associated with a video encoder (e.g., an encoder described in association with FIGS. 2A-2B) or a video decoder (e.g., a decoder described in association with FIGS. 3A-3B). In some embodiments, methods 1300-1500 can be implemented as a computer program product (e.g., embodied in a computer-readable medium) that includes computer-executable instructions (e.g., program codes) to be executed by a computer (e.g., apparatus 400 in FIG. 4). In some embodiments, methods 1300-1500 can be implemented as a hardware product (e.g., memory 404 in FIG. 4) that stores computer-executable instructions (e.g., program instructions in memory 404 in FIG. 4), and the hardware product can be a standalone or integrated part of the computer.

By way of example, FIG. 13 illustrates a flowchart of an example process 1300 for video processing, according to some embodiments of this disclosure. For example, process 1300 can be performed by an encoder.

At step 1302, in response to a processor (e.g., processor 402 in FIG. 4) receiving a video sequence (e.g., video sequence 202 in FIGS. 2A-2B), the processor can encode first flag data (e.g., "gdr_enabled_flag" as shown and described in association with FIGS. 10-12) in a parameter set (e.g., an SPS) associated with the video sequence. The first flag data can represent that gradual decoding refresh (GDR) is enabled or disabled for the video sequence.

At step 1304, when the first flag data represents that GDR is disabled (e.g., "gdr_enabled_flag" being false) for the video sequence, the processor can encode a picture header associated with a picture in the video sequence to indicate that the picture is a non-GDR picture. A GDR picture, as used herein, can refer to a picture that includes both a clean region and a dirty region. By way of example, the clean region can be any of clean regions 516, 520, 524, or 528 as shown and described in FIG. 5, and the dirty region can be any of dirty regions 514, 518, 522, or 526 as shown and described in FIG. 5. A non-GDR picture in this disclosure can refer to a picture that includes no clean region or no dirty region.

In some embodiments, to encode the picture header, the processor can disable encoding second flag data (e.g., "gdr_pic_flag" as shown and described in association with FIGS. 10-12) in the picture header. The second flag data can represent whether the picture is a GDR picture.

In some embodiments, to encode the picture header, the processor can encode second flag data (e.g., "gdr_pic_flag" as shown and described in association with FIGS. 10-12) in the picture header, and the second flag data represents that the picture is the non-GDR picture (e.g., "gdr_pic_flag" being false).

At step 1306, the processor can encode the non-GDR picture.

Consistent with some embodiments of this disclosure, when the first flag data represents that GDR is enabled (e.g., "gdr_enabled_flag" being true) for the video sequence, the processor can enable encoding second flag data (e.g., "gdr_pic_flag" as shown and described in association with FIGS. 10-12) in the picture header, and the second flag data represents whether the picture is a GDR picture (e.g., "gdr_pic_flag" being true). The processor can then encode the picture.

Consistent with some embodiments of this disclosure, when the first flag data represents that GDR is enabled (e.g., "gdr_enabled_flag" being true) for the video sequence and the second flag data represents that the picture is a GDR picture (e.g., "gdr_pic_flag" being true), the processor can divide the picture into a first region (e.g., a clean region such as any of clean regions 516, 520, 524, or 528 as shown and described in FIG. 5) and a second region (e.g., a dirty region such as any of dirty regions 514, 518, 522, or 526 as shown and described in FIG. 5) using a virtual boundary. For example, the first region can be a first side (e.g., left, right, top, or bottom side) of the virtual boundary, and the second region can be a second side (e.g., right, left, bottom, or top side) of the virtual boundary. Then, the processor can disable a loop filter (e.g., loop filter 232 shown and described in association with FIGS. 2B and 3B) on a first pixel in the first region when filtering the first pixel uses information of a second pixel in the second region, or applying the loop filter on the first pixel only using information of pixels in the first region. After that, the processor can apply the loop filter on pixels in the second region using pixels in at least one of the first region or the second region.

By way of example, FIG. 14 illustrates a flowchart of another example process 1400 for video processing, according to some embodiments of this disclosure. For example, process 1400 can be performed by a decoder.

At step 1402, in response to a processor (e.g., processor 402 in FIG. 4) receiving a video bitstream (e.g., video bitstream 228 in FIGS. 3A-3B), the processor can decode first flag data (e.g., "gdr_enabled_flag" as shown and described in association with FIGS. 10-12) in a parameter set (e.g., a SPS) associated with a sequence (e.g., a decoded video sequence) of the video bitstream. The first flag data can represent whether gradual decoding refresh (GDR) is enabled or disabled for the video sequence.

At step 1404, when the first flag data represents that GDR is disabled (e.g., "gdr_enabled_flag" being false) for the sequence, the processor can decode a picture header associated with a picture in the sequence, in which the picture header indicates that the picture is a non-GDR picture.

In some embodiments, to decode the picture header, the processor can disable decoding second flag data (e.g., "gdr_pic_flag" as shown and described in association with FIGS. 10-12) in the picture header and determine that the picture is the non-GDR picture, in which the second flag data can indicate whether the picture is a GDR picture. In some embodiments, to decode the picture header, the processor can decode second flag data in the picture header, in which the second flag data can indicate that the picture is the non-GDR picture (e.g., "gdr_pic_flag" being false).

At step 1406, the processor can decode the non-GDR picture.

Consistent with some embodiments of this disclosure, when the first flag data represents that GDR is enabled (e.g., "gdr_enabled_flag" being true) for the video sequence, the processor can decode second flag data (e.g., "gdr_pic_flag" as shown and described in association with FIGS. 10-12) in the picture header and determine whether the picture is a GDR picture (e.g., "gdr_pic_flag" being true) based on the second flag data. Then, the processor can decode the picture.

Consistent with some embodiments of this disclosure, when the first flag data represents that GDR is enabled for the video sequence and the second flag data represents that the picture is the GDR picture, the processor can divide the picture into a first region (e.g., a clean region such as any of clean regions 516, 520, 524, or 528 as shown and described in FIG. 5) and a second region (e.g., a dirty region such as any of dirty regions 514, 518, 522, or 526 as shown and described in FIG. 5) using a virtual boundary. For example, the first region can be a first side (e.g., left, right, top, or bottom side) of the virtual boundary, and the second region can be a second side (e.g., right, left, bottom, or top side) of the virtual boundary. Then, the processor can disable a loop filter (e.g., loop filter 232 shown and described in association with FIGS. 2B and 3B) in the first region, or apply the loop filter on the first pixel only using information of pixels in the first region. After that, the processor can apply the loop filter on pixels in the second region using pixels in at least one of the first region or the second region.

By way of example, FIG. 15 illustrates a flowchart of yet another example process 1500 for video processing, according to some embodiments of this disclosure. For example, process 1500 can be performed by an encoder or a decoder.

At step 1502, in response to a processor (e.g., processor 402 in FIG. 4) receiving a picture of a video, the processor determines whether the picture is a gradual decoding refresh (GDR) based on flag data associated with the picture. For example, the flag data can be at a sequence level (e.g., stored in an SPS) or a picture level (e.g., stored in a picture header).

At step 1504, based on a determination that the picture is a GDR picture, the processor can determine a first region (e.g., a clean region such as any of clean regions 516, 520, 524, or 528 as shown and described in FIG. 5) and a second region (e.g., a dirty region such as any of dirty regions 514, 518, 522, or 526 as shown and described in FIG. 5) for the picture using a virtual boundary. For example, the first region can include a left region or an upper region, and the second region can include a right region or a lower region.

At step 1506, the processor can disable a loop filter (e.g., loop filter 232 shown and described in association with FIGS. 2B and 3B) on a first pixel in the first region when filtering the first pixel uses information of a second pixel in the second region, or apply the loop filter to the first pixel only using information of pixels in the first region. In some embodiments, the processor can disable at least one of a sample adaptive offset, a de-blocking filter, or an adaptive loop filter in the first region, or apply at least one of the sample adaptive offset, the de-blocking filter, or the adaptive loop filter using the pixels in the first region.

At step 1508, the processor can apply the loop filter on pixels in the second region using pixels in at least one of the first region or the second region.

Consistent with some embodiments of this disclosure, the processor can encode or decode the flag data in at least one of a sequence parameter set (SPS), a picture parameter set (PPS), or a picture header. For example, the processor can encode the flag data as the GDR indication flag "gdr_enabled_flag," as the GDR indication flag "gdr_pic_flag," or as both, as shown and described in association with FIGS. 10-12.

In some embodiments, a non-transitory computer-readable storage medium including instructions is also provided, and the instructions can be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

The embodiments can further be described using the following clauses:

1. A non-transitory computer-readable medium storing a set of instructions that is executable by at least one processor of an apparatus to cause the apparatus to perform a method, the method comprising:
   in response to receiving a video sequence, encoding first flag data in a parameter set associated with the video sequence, wherein the first flag data represents whether gradual decoding refresh (GDR) is enabled or disabled for the video sequence;
   when the first flag data represents that the GDR is disabled for the video sequence, encoding a picture header associated with a picture in the video sequence to indicate that the picture is a non-GDR picture; and
   encoding the non-GDR picture.

2. The non-transitory computer-readable medium of clause 1, wherein encoding the picture header comprises:
   disabling encoding second flag data in the picture header, wherein the second flag data represents whether the picture is a GDR picture.

3. The non-transitory computer-readable medium of clause 1, wherein encoding the picture header comprises:
   encoding second flag data in the picture header, wherein the second flag data represents that the picture is the non-GDR picture.

4. The non-transitory computer-readable medium of clause 1, wherein the set of instructions that is executable by the at least one processor of the apparatus causes the apparatus to further perform:
   when the first flag data represents that the GDR is enabled for the video sequence, enabling encoding second flag data in the picture header, wherein the second flag data represents whether the picture is a GDR picture; and
   encoding the picture.

5. The non-transitory computer-readable medium of any of clauses 2-4, wherein the set of instructions that is executable by the at least one processor of the apparatus causes the apparatus to further perform:
   when the first flag data represents that the GDR is enabled for the video sequence and the second flag data represents that the picture is a GDR picture, dividing the picture into a first region and a second region using a virtual boundary;
   disabling a loop filter on a first pixel in the first region when filtering the first pixel uses information of a second pixel in the second region, or applying the loop filter on the first pixel only using information of pixels in the first region; and
   applying the loop filter on pixels in the second region using pixels in at least one of the first region or the second region.

6. The non-transitory computer-readable medium of any of clauses 2-5, wherein the second flag data has a value of "1" representing that the picture is a GDR picture or a value of "0" representing that the picture is the non-GDR picture.

7. The non-transitory computer-readable medium of any of clauses 1-6, wherein the second flag data has a value of "1" representing that the picture is a GDR picture or a value of "0" representing that the picture is the non-GDR picture.

8. A non-transitory computer-readable medium storing a set of instructions that is executable by at least one processor of an apparatus to cause the apparatus to perform a method, the method comprising:
   in response to receiving a video bitstream, decoding first flag data in a parameter set associated with a sequence of the video bitstream, wherein the first flag data represents whether gradual decoding refresh (GDR) is enabled or disabled for the video sequence;

when the first flag data represents that the GDR is disabled for the sequence, decoding a picture header associated with a picture in the sequence, wherein the picture header indicates that the picture is a non-GDR picture; and decoding the non-GDR picture.

9. The non-transitory computer-readable medium of clause 8, wherein decoding the picture header comprises:

disabling decoding second flag data in the picture header and determining that the picture is the non-GDR picture, wherein the second flag data indicates whether the picture is a GDR picture.

10. The non-transitory computer-readable medium of clause 8, wherein decoding the picture header comprises:

decoding second flag data in the picture header, wherein the second flag data indicates that the picture is the non-GDR picture.

11. The non-transitory computer-readable medium of clause 8, wherein the set of instructions that is executable by the at least one processor of the apparatus causes the apparatus to further perform:

when the first flag data represents that the GDR is enabled for the video sequence, decoding second flag data in the picture header and determining whether the picture is a GDR picture based on the second flag data; and decoding the picture.

12. The non-transitory computer-readable medium of any of clauses 8-11, wherein the set of instructions that is executable by the at least one processor of the apparatus causes the apparatus to further perform:

when the first flag data represents that the GDR is enabled for the video sequence and the second flag data represents that the picture is a GDR picture, dividing the picture into a first region and a second region using a virtual boundary;

disabling a loop filter on a first pixel in the first region when filtering the first pixel uses information of a second pixel in the second region, or applying the loop filter on the first pixel only using information of pixels in the first region; and applying the loop filter on pixels in the second region using pixels in at least one of the first region or the second region.

13. The non-transitory computer-readable medium of any of clauses 9-12, wherein the second flag data has a value of "1" representing that the picture is a GDR picture or a value of "0" representing that the picture is the non-GDR picture.

14. The non-transitory computer-readable medium of any of clauses 8-13, wherein the second flag data has a value of "1" representing that the picture is a GDR picture or a value of "0" representing that the picture is the non-GDR picture.

15. A non-transitory computer-readable medium storing a set of instructions that is executable by at least one processor of an apparatus to cause the apparatus to perform a method, the method comprising:

in response to receiving a picture of a video, determining, based on flag data associated with the picture, whether the picture is a gradual decoding refresh (GDR) picture;

based on a determination that the picture is the GDR picture, determining a first region and a second region for the picture using a virtual boundary;

disabling a loop filter on a first pixel in the first region when filtering the first pixel uses information of a second pixel in the second region, or applying the loop filter on the first pixel only using information of pixels in the first region; and applying the loop filter on pixels in the second region using pixels in at least one of the first region or the second region.

16. The non-transitory computer-readable medium of clause 15, wherein disabling the loop filter on the first pixel in the first region when filtering the first pixel uses the information of the second pixel in the second region, or applying the loop filter on the first pixel only using the information of pixels in the first region comprises:

disabling at least one of a sample adaptive offset, a de-blocking filter, or an adaptive loop filter in the first region; or applying at least one of the sample adaptive offset, the de-blocking filter, or the adaptive loop filter using the pixels in the first region.

17. The non-transitory computer-readable medium of any of clauses 15-16, wherein the set of instructions that is executable by the at least one processor of the apparatus causes the apparatus to further perform:

encoding or decoding the flag data in at least one of a sequence parameter set (SPS), a picture parameter set (PPS), or a picture header.

18. The non-transitory computer-readable medium of any of clauses 15-17, wherein the first region comprises a left region or an upper region, and the second region comprises a right region or a lower region.

19. The non-transitory computer-readable medium of any of clauses 15-18, wherein the flag data has a value of "1" representing that the picture is the GDR picture or a value of "0" representing that the picture is a non-GDR picture.

20. An apparatus, comprising:

a memory configured to store a set of instructions; and one or more processors communicatively coupled to the memory and configured to execute the set of instructions to cause the apparatus to perform:

in response to receiving a video sequence, encoding first flag data in a parameter set associated with the video sequence, wherein the first flag data represents whether gradual decoding refresh (GDR) is enabled or disabled for the video sequence;

when the first flag data represents that the GDR is disabled for the video sequence, encoding a picture header associated with a picture in the video sequence to indicate that the picture is a non-GDR picture; and encoding the non-GDR picture.

21. The apparatus of clause 20, wherein encoding the picture header comprises:

disabling encoding second flag data in the picture header, wherein the second flag data represents whether the picture is a GDR picture.

22. The apparatus of clause 20, wherein encoding the picture header comprises:

encoding second flag data in the picture header, wherein the second flag data represents that the picture is the non-GDR picture.

23. The apparatus of clause 20, wherein the one or more processors are further configured to execute the set of instructions to cause the apparatus to perform:
when the first flag data represents that the GDR is enabled for the video sequence, enabling encoding second flag data in the picture header, wherein the second flag data represents whether the picture is a GDR picture; and
encoding the picture.
24. The apparatus of any of clauses 21-23, wherein the one or more processors are further configured to execute the set of instructions to cause the apparatus to perform:
when the first flag data represents that the GDR is enabled for the video sequence and the second flag data represents that the picture is a GDR picture, dividing the picture into a first region and a second region using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.
25. The apparatus of any of clauses 21-24, wherein the second flag data has a value of "1" representing that the picture is a GDR picture or a value of "0" representing that the picture is the non-GDR picture.
26. The apparatus of any of clauses 20-25, wherein the second flag data has a value of "1" representing that the picture is a GDR picture or a value of "0" representing that the picture is the non-GDR picture.
27. An apparatus, comprising:
a memory configured to store a set of instructions; and
one or more processors communicatively coupled to the memory and configured to execute the set of instructions to cause the apparatus to perform:
in response to receiving a video bitstream, decoding first flag data in a parameter set associated with a sequence of the video bitstream, wherein the first flag data represents whether gradual decoding refresh (GDR) is enabled or disabled for the video sequence;
when the first flag data represents that the GDR is disabled for the sequence, decoding a picture header associated with a picture in the sequence, wherein the picture header indicates that the picture is a non-GDR picture; and
decoding the non-GDR picture.
28. The apparatus of clause 27, wherein decoding the picture header comprises:
disabling decoding second flag data in the picture header and determining that the picture is the non-GDR picture, wherein the second flag data indicates whether the picture is a GDR picture.
29. The apparatus of clause 27, wherein decoding the picture header comprises:
decoding second flag data in the picture header, wherein the second flag data indicates that the picture is the non-GDR picture.
30. The apparatus of clause 27, wherein the one or more processors are further configured to execute the set of instructions to cause the apparatus to perform:
when the first flag data represents that the GDR is enabled for the video sequence, decoding second flag data in the picture header and determining whether the picture is a GDR picture based on the second flag data; and
decoding the picture.
31. The apparatus of any of clauses 28-30, wherein the one or more processors are further configured to execute the set of instructions to cause the apparatus to perform:
when the first flag data represents that the GDR is enabled for the video sequence and the second flag data represents that the picture is a GDR picture, dividing the picture into a first region and a second region using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.
32. The apparatus of any of clauses 28-31, wherein the second flag data has a value of "1" representing that the picture is a GDR picture or a value of "0" representing that the picture is the non-GDR picture.
33. The apparatus of any of clauses 27-32, wherein the second flag data has a value of "1" representing that the picture is a GDR picture or a value of "0" representing that the picture is the non-GDR picture.
34. An apparatus, comprising:
a memory configured to store a set of instructions; and
one or more processors communicatively coupled to the memory and configured to execute the set of instructions to cause the apparatus to perform:
in response to receiving a picture of a video, determining, based on flag data associated with the picture, whether the picture is a gradual decoding refresh (GDR) picture;
based on a determination that the picture is the GDR picture, determining a first region and a second region for the picture using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.
35. The apparatus of clause 34, wherein disabling the loop filter on the first pixel in the first region when filtering the first pixel uses the information of the second pixel in the second region, or applying the loop filter on the first pixel only using the information of the pixels in the first region comprises:
disabling at least one of a sample adaptive offset, a de-blocking filter, or an adaptive loop filter in the first region, or applying at least one of the sample adaptive offset, the de-blocking filter, or the adaptive loop filter using the pixels in the first region.
36. The apparatus of any of clauses 34-35, wherein the one or more processors are further configured to execute the set of instructions to cause the apparatus to perform:
encoding or decoding the flag data in at least one of a sequence parameter set (SPS), a picture parameter set (PPS), or a picture header.

37. The apparatus of any of clauses 34-36, wherein the first region comprises a left region or an upper region, and the second region comprises a right region or a lower region.
38. The apparatus of any of clauses 34-37, wherein the flag data has a value of "1" representing that the picture is the GDR picture or a value of "0" representing that the picture is a non-GDR picture.
39. A method, comprising:
in response to receiving a video sequence, encoding first flag data in a parameter set associated with the video sequence, wherein the first flag data represents whether gradual decoding refresh (GDR) is enabled or disabled for the video sequence;
when the first flag data represents that the GDR is disabled for the video sequence, encoding a picture header associated with a picture in the video sequence to indicate that the picture is a non-GDR picture; and
encoding the non-GDR picture.
40. The method of clause 39, wherein encoding the picture header comprises:
disabling encoding second flag data in the picture header, wherein the second flag data represents whether the picture is a GDR picture.
41. The method of clause 39, wherein encoding the picture header comprises:
encoding second flag data in the picture header, wherein the second flag data represents that the picture is the non-GDR picture.
42. The method of clause 39, further comprising:
when the first flag data represents that the GDR is enabled for the video sequence, enabling encoding second flag data in the picture header, wherein the second flag data represents whether the picture is a GDR picture; and
encoding the picture.
43. The method of any of clauses 40-42, further comprising:
when the first flag data represents that the GDR is enabled for the video sequence and the second flag data represents that the picture is a GDR picture, dividing the picture into a first region and a second region using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.
44. The method of any of clauses 40-43, wherein the second flag data has a value of "1" representing that the picture is a GDR picture or a value of "0" representing that the picture is the non-GDR picture.
45. The method of any of clauses 39-44, wherein the second flag data has a value of "1" representing that the picture is a GDR picture or a value of "0" representing that the picture is the non-GDR picture.
46. A method, comprising:
in response to receiving a video bitstream, decoding first flag data in a parameter set associated with a sequence of the video bitstream, wherein the first flag data represents whether gradual decoding refresh (GDR) is enabled or disabled for the video sequence;
when the first flag data represents that the GDR is disabled for the sequence, decoding a picture header associated with a picture in the sequence, wherein the picture header indicates that the picture is a non-GDR picture; and
decoding the non-GDR picture.
47. The method of clause 46, wherein decoding the picture header comprises:
disabling decoding second flag data in the picture header and determining that the picture is the non-GDR picture, wherein the second flag data indicates whether the picture is a GDR picture.
48. The method of clause 46, wherein decoding the picture header comprises:
decoding second flag data in the picture header, wherein the second flag data indicates that the picture is the non-GDR picture.
49. The method of clause 46, further comprising:
when the first flag data represents that the GDR is enabled for the video sequence, decoding second flag data in the picture header and determining whether the picture is a GDR picture based on the second flag data; and
decoding the picture.
50. The method of any of clauses 47-49, further comprising:
when the first flag data represents that the GDR is enabled for the video sequence and the second flag data represents that the picture is the GDR picture, dividing the picture into a first region and a second region using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.
51. The method of any of clauses 47-50, wherein the second flag data has a value of "1" representing that the picture is a GDR picture or a value of "0" representing that the picture is the non-GDR picture.
52. The method of any of clauses 46-51, wherein the second flag data has a value of "1" representing that the picture is a GDR picture or a value of "0" representing that the picture is the non-GDR picture.
53. A method, comprising:
in response to receiving a picture of a video, determining, based on flag data associated with the picture, whether the picture is a gradual decoding refresh (GDR) picture;
based on a determination that the picture is the GDR picture, determining a first region and a second region for the picture using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.
54. The method of clause 53, wherein disabling the loop filter on the first pixel in the first region when filtering the first pixel uses the information of the second pixel in the second region, or applying the loop filter on the first pixel only using the information of the pixels in the first region comprises:
  disabling at least one of a sample adaptive offset, a de-blocking filter, or an adaptive loop filter in the first region, or applying at least one of the sample adaptive offset, the de-blocking filter, or the adaptive loop filter using the pixels in the first region.
55. The method of any of clauses 53-54, further comprising:
  encoding or decoding the flag data in at least one of a sequence parameter set (SPS), a picture parameter set (PPS), or a picture header.
56. The method of any of clauses 53-55, wherein the first region comprises a left region or an upper region, and the second region comprises a right region or a lower region.
57. The apparatus of any of clauses 53-56, wherein the flag data has a value of "1" representing that the picture is the GDR picture or a value of "0" representing that the picture is a non-GDR picture.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art can also understand that multiple ones of the above described modules/units can be combined as one module/unit, and each of the above described modules/units can be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as example only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed example embodiments. However, many variations and modifications can be made to these embodiments. Accordingly, although specific terms are employed, they are used in a generic and descriptive sense only and not for purposes of limitation.

What is claimed is:

1. A method for encoding a video sequence, comprising:
  receiving a video sequence;
  encoding a first flag indicating whether gradual decoding refresh (GDR) is enabled or disabled in the video sequence, and a second flag indicating whether a picture in the video sequence is a GDR picture or not, wherein
  when the first flag indicates that the GDR is enabled the video sequence, the second flag has a first value indicating the picture in the video sequence is a GDR picture or has a second value indicating the picture in the video sequence is not a GDR picture; and
  when the first flag indicates that the GDR is disabled in the video sequence, the second flag has the second value indicating the picture in the video sequence is not the GDR picture.

2. The method according to claim 1, wherein
  the first flag is signaled in a sequence parameter set (SPS) associated with the video sequence and the second flag is signaled in a picture header (PH) associated with the picture in the video sequence.

3. The method according to claim 1, wherein the first flag has a first value indicating that the GDR is enabled for the video sequence; or a second value indicating that the GDR is disabled for the video sequence.

4. The method according to claim 1, wherein the first value of the second flag is equal to 1, and the second value of the second flag is equal to 0.

5. The method according to claim 1, wherein in response to the first flag indicating that the GDR is enabled for the video sequence and the second flag indicating that the picture is the GDR picture, dividing the picture into a first region and a second region using a virtual boundary;
  disabling a loop filter on a first pixel in the first region when filtering the first pixel uses information of a second pixel in the second region, or applying the loop filter on the first pixel only using information of pixels in the first region; and
  applying the loop filter on pixels in the second region using pixels in at least one of the first region or the second region.

6. The method according to claim 5, wherein disabling the loop filter on the first pixel in the first region when filtering the first pixel uses information of the second pixel in the second region, or applying the loop filter on the first pixel only using information of pixels in the first region comprises:
  disabling at least one of a sample adaptive offset, a de-blocking filter, or an adaptive loop filter in the first region; or
  applying at least one of the sample adaptive offset, the de-blocking filter, or the adaptive loop filter using the pixels in the first region.

7. A method of decoding a bitstream to output one or more pictures for a video stream, the method comprising:
receiving a bitstream; and
decoding, using coded information of the bitstream, one or more pictures,
wherein the decoding comprises:
- decoding a first flag indicating whether gradual decoding refresh (GDR) is enabled or disabled in a video sequence, and a second flag indicating whether a picture in the video sequence is a GDR picture or not from the bitstream; wherein
- when the first flag indicates that GDR pictures are enabled in the video sequence, the second flag has a first value indicating that the picture in the video sequence is a GDR picture or has a second value indicating that the picture in the video sequence is not a GDR picture; and
- when the first flag indicates that GDR pictures are disabled in the video sequence, the second flag has the second value indicating that the picture in the video sequence is not a GDR picture.

8. The method according to claim 7, wherein
the first flag is decoded from a sequence parameter set (SPS) associated with the video sequence and the second flag is decoded from a picture header (PH) associated with the picture in the video sequence.

9. The method according to claim 7, wherein the first flag has a first value indicating that the GDR is enabled for the video sequence; or a second value indicating that the GDR is disabled for the video sequence.

10. The method according to claim 7, wherein the first value of the second flag is equal to 1, and the second value of the second flag is equal to 0.

11. The method according to claim 7, wherein in response to the first flag indicating that the GDR is enabled for the video sequence and the second flag indicating that the picture is the GDR picture, dividing the picture into a first region and a second region using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.

12. The method according to claim 11, wherein disabling the loop filter on the first pixel in the first region when filtering the first pixel uses information of the second pixel in the second region, or applying the loop filter on the first pixel only using information of pixels in the first region comprises:
disabling at least one of a sample adaptive offset, a de-blocking filter, or an adaptive loop filter in the first region; or
applying at least one of the sample adaptive offset, the de-blocking filter, or the adaptive loop filter using the pixels in the first region.

13. A non-transitory computer readable storage medium storing a bitstream of a video for processing according to operations comprising:
decoding a first flag indicating whether gradual decoding refresh (GDR) is enabled or disabled in a video sequence, and a second flag indicating whether a picture in the video sequence is a GDR picture or not; wherein
when the first flag indicates that the GDR pictures are enabled in the video sequence, the second flag has a first value indicating that the picture in the video sequence is a GDR picture or has a second value indicating that the picture in the video sequence is not a GDR picture; and
when the first flag indicates that the GDR pictures are disabled in the video sequence, the second flag has the second value indicating that the picture in the video sequence is not a GDR picture.

14. The non-transitory computer readable storage medium according to claim 13, wherein the first flag is signaled in a sequence parameter set (SPS) associated with the video sequence and the second flag is signaled in a picture header (PH) associated with the picture in the video sequence.

15. The non-transitory computer readable storage medium according to claim 13, wherein the first flag has a first value indicating that the GDR is enabled for the video sequence; or a second value indicating that the GDR is disabled for the video sequence.

16. The non-transitory computer readable storage medium according to claim 13, wherein the first value of the second flag is equal to 1, and the second value of the second flag is equal to 0.

17. The non-transitory computer readable medium storage according to claim 13, wherein the operations further comprise:
when the first flag indicates that the GDR is enabled for the video sequence and the second flag indicates that the picture is the GDR picture, dividing the picture into a first region and a second region using a virtual boundary;
disabling a loop filter on a first pixel in the first region when filtering the first pixel uses information of a second pixel in the second region, or applying the loop filter on the first pixel only using information of pixels in the first region; and
applying the loop filter on pixels in the second region using pixels in at least one of the first region or the second region.

18. The non-transitory computer readable storage medium according to claim 17, wherein disabling the loop filter on the first pixel in the first region when filtering the first pixel uses information of the second pixel in the second region, or applying the loop filter on the first pixel only using information of pixels in the first region comprises:
disabling at least one of a sample adaptive offset, a de-blocking filter, or an adaptive loop filter in the first region; or
applying at least one of the sample adaptive offset, the de-blocking filter, or the adaptive loop filter using the pixels in the first region.

\* \* \* \* \*